(12) United States Patent
Giannotta

(10) Patent No.: US 11,624,165 B2
(45) Date of Patent: Apr. 11, 2023

(54) ELECTRICAL POWER GENERATING APPARATUS

(71) Applicant: Eugene A. Giannotta, Naples, FL (US)

(72) Inventor: Eugene A. Giannotta, Naples, FL (US)

( * ) Notice: Subject to any disclaimer, the term of this patent is extended or adjusted under 35 U.S.C. 154(b) by 26 days.

(21) Appl. No.: 17/200,942

(22) Filed: Mar. 15, 2021

(65) Prior Publication Data
US 2022/0049441 A1    Feb. 17, 2022

Related U.S. Application Data

(63) Continuation-in-part of application No. 16/993,440, filed on Aug. 14, 2020.

(51) Int. Cl.
| | |
|---|---|
| *E01F 11/00* | (2006.01) |
| *H02J 15/00* | (2006.01) |
| *H02K 7/18* | (2006.01) |
| *H02J 3/32* | (2006.01) |

(52) U.S. Cl.
CPC .............. *E01F 11/00* (2013.01); *H02J 3/32* (2013.01); *H02J 15/007* (2020.01); *H02K 7/1869* (2013.01); *H02J 2300/20* (2020.01)

(58) Field of Classification Search
CPC .......... E01F 11/00; H02J 15/007; H02J 3/32; H02J 2300/20; H02K 7/1869
See application file for complete search history.

(56) References Cited

U.S. PATENT DOCUMENTS

| | | | | |
|---|---|---|---|---|
| 2,200,739 A | * | 5/1940 | Evans ..................... | E01F 9/529 |
| | | | | 340/928 |
| 4,901,334 A | * | 2/1990 | Gibson ................... | E01F 11/00 |
| | | | | 340/940 |
| 11,451,113 B2 | * | 9/2022 | Giannotta ................ | E01C 1/00 |
| 2013/0127268 A1 | * | 5/2013 | Atherton .................. | G01P 3/22 |
| | | | | 310/46 |
| 2014/0339833 A1 | * | 11/2014 | Chiu .................... | H02K 7/1853 |
| | | | | 74/25 |
| 2015/0084344 A1 | * | 3/2015 | Turner ................ | H02K 7/1853 |
| | | | | 290/1 D |

(Continued)

FOREIGN PATENT DOCUMENTS

WO    WO-2020172352 A1 * 8/2020 ............... F03G 3/08

*Primary Examiner* — Viet P Nguyen
(74) *Attorney, Agent, or Firm* — Southern Plains IP Law PLLC; Sue C. Watson

(57) ABSTRACT

An electrical power generating apparatus for generating electrical power using a generator connected directly or indirectly to a flywheel is disclosed. The apparatus comprises items such as platforms, protrusions, generators, flywheels and other components. The platforms are configured to be laid on a surface and easily allow an object, e.g., a vehicle to traverse over the platforms. Each protrusion is configured to move downward and upward through apertures located in a top portion of the platform. The protrusions may interact with reset members. The protrusions move in a linear/angle downward/downward-upward motion when the object pushes/strikes/depresses the protrusions. Each protrusion can be connected in an operative manner to a shaft via a gear, and/or to a lever which is connected in an operative manner to shaft, thereby rotating the shaft by converting linear motion to rotational motion. A generator, flywheel, and gearbox can be coupled to one or more shaft.

20 Claims, 24 Drawing Sheets

(56) References Cited

U.S. PATENT DOCUMENTS

2017/0198401 A1\* 7/2017 Phillips ................. H02K 35/02
2019/0234032 A1\* 8/2019 Lowe ..................... E01F 9/553
2022/0166289 A1\* 5/2022 McIntosh ............. H02K 7/1853

\* cited by examiner

ELECTRICAL POWER GENERATING APPARATUS

CROSS-REFERENCE TO RELATED APPLICATION

This application is a Continuation-in-part to U.S. patent application Ser. No. 16/993,440, titled "ELECTRICAL POWER GENERATING APPARATUS" filed on Aug. 14, 2020. The specification of the above referenced patent application is incorporated herein by reference in its entirety.

BACKGROUND OF THE INVENTION

A. Technical Field

The invention being disclosed within generally relates to an electrical power generating apparatus. Specifically, this invention relates to an electrical power generating apparatus that produces electricity by harnessing the moving and/or stopped weight/force of object(s) such as, but not limited to, vehicles, people, and so forth, as they traverse across/along surfaces such as, road surfaces, highways, streets, and so on, in the course of their customary activity without slowing down the speed/velocity of said object(s) by anything more than negligible levels.

B. Description of Related Art

Throughout the world efforts are being made to reduce carbon emissions and increase the production of electricity from clean energy sources. Innovative solutions to reduce carbon emissions and harness renewable energy resources are the focus of many of today's scientific endeavors. In general, the present invention harnesses and recycles the movement of objects such as, but not limited to, vehicle tires affixed to vehicles, and/or people, as said objects traverse along surfaces, and their weight exerts a force on said surfaces, and the present invention is also used to provide other services.

Today, electric power is produced from both non-renewable and renewable energy sources. Non-renewable sources such as oil, natural gas, coal, and renewable sources such as hydroelectric, wind, solar, geothermal, etc. Electricity generated from non-renewable energy sources is known to cause pollution and is also thought to contribute to climate change.

Much of the electricity generated from renewable energy sources has typically been more costly than electricity generated from non-renewable resources and unfortunately has had its own unintended environmental consequences. For example, wind turbines are known to kill significant numbers of birds every year, and ground based solar power systems consume large swaths of land and are manufactured with hazardous materials.

A prior art, WO2019046816 assigned to Bish Daniel, discloses an energy harvesting system fashioned into speed bumps and/or affixed inside roadways that includes abase plate with an external surface that supports the multiple actuators that is used to actuate the generator through the rack and pinion that is contained within the housing, wherein the actuator is protruding out of the housing top. The system further includes a generator, spring and disc. The actuator is depressed by the weight of the passing vehicle and then engages with the spring that is compressed and then it engages the rack and pinion to activate the generator with a flywheel that is used as a mechanical storage device. The device includes a one-way bearing that can be coupled to the main shaft such that the rotation of the main shaft can result in the rotation of the one-way bearing and the bearing can be selected based on the position of the main shaft. The actuators protrude from the top of the housing to the surface and receive pressure or force from different angles that can be used to generate electricity by use of a generator. Additionally, the actuators are positioned in a such a way that multiple actuators are engaged at once by the passing vehicle. The rack and pinion system includes a gear that can be of various type such as a planetary gear system, or epicyclic gear train, which can comprise one or more outer gears, and wherein the attached gears increase or decrease the gear ratio or assist in translation of motion. However, this system, by its design, may be very costly to implement and maintain because it is situated/affixed "inside roadways". This means that when the invention is installed anywhere roadways currently exist, there will be sizable costs involved in ripping up/tearing out the existing road pavement to install the invention. Plus, since this system is affixed "inside roadways", consider the costs that will be involved to accessing the system's components for routine maintenance. Plus, this system can easily slow down the speed/velocity of vehicles. Thus, if the system were used in applications other than speed bumps it would slow vehicles down, which means vehicles will need to consume more energy in the course of their customary activity. When vehicles must consume more/additional energy to advance in order to produce electricity for other uses, it does not seem efficient/beneficial. The aforementioned items are just some areas of concern with this energy harvesting system.

Another prior art, JP2008255978 of Brier et al., discloses an electric power generator "installed under the sidewalk or the roadway" which uses the movement of a person or a vehicle to power the generator installed under the sidewalk or roadway. The invention discloses the use of a shaft with teeth and a spring and a tread board. The system is covered with an iron plate or rubber sheet. The generator is connected to a battery through a rectifier and regulator. The stored electricity in the battery is used as a power source for an illumination lamp or other electric appliances. It seems this system will also be costly to install and maintain because it is situated "under the sidewalk or the roadway", which means that in areas other than those where brand new sidewalks are being poured, or brand-new roads are being laid, one would have to destroy existing infrastructure in order to install this apparatus. That would be a sizeable additional expense.

Accordingly, there is a need for an electrical power generating apparatus that 1) efficiently generates electrical power by utilizing and converting the movements of objects, such as a vehicle's tires, or people, etc, as said objects move along/across surfaces, such as highways/streets in the course of their customary activity, 2) can be manufactured/produced and installed in a cost effective manner 3) does not destroy existing roadways/highways/pavement. 4) restores/repairs/extends the life of existing road surfaces, 5) can be easily and cost effectively maintained; 6) can generate significant torque to rotate electric power producing generator(s), yet does not cause the object to consume more energy compared to the pre-existing surface it replaces or is placed on top of. This new innovative invention fulfills all the aforementioned needs and more.

SUMMARY OF THE INVENTION

The present invention discloses an electrical power generating apparatus. Specifically, the present invention relates to an electrical power generating apparatus for generating electrical power by utilizing and converting the moving weight and/or stopped weight of objects, such as but not limited to vehicle tires when affixed to a vehicle, and/or to the moving weight and/or stopped weight of people, etc. as said objects traverse/move across the top of platforms. Said platforms can be placed on top of any surfaces, for example road surfaces, highways, streets, and so forth. Objects will move along the top of the said platforms in the course of their customary activity. This invention focuses on harnessing/using the moving and/or stopped weight of one or more objects via the platforms and its components. Thus, in the case of a vehicle, we are referring to a vehicle's tires when said tire's road contact surface/patch come into contact with a platform surface. When vehicles/objects moves/advances across a platform surface, their weight/force is distributed to the platform surface along contact patches where the vehicle's tires come into contact with the platform at any given time. For example, a typical vehicle (for example, a Car, SUV, and a pickup truck) on U.S. highways/roadways may have its tires inflated in a range of approximately 30-35 pounds per square inch of tire pressure. Thus, the vehicle's weight is actually distributed throughout each square inch of each tire at the point where the contact patch of the tire contacts a road surface. Thus in this case roughly 30-35 pounds of a vehicle's weight is/are distributed per each square inch of each tire's contact patch that comes into contact with a road surface. Thus, the present invention is designed to limit the weight/force harnessed to a level at or below the actual weight of the vehicle that presses down on/thru any of the vehicle's tires at the points/areas that the tires come into contact with a surface, or before they would otherwise contact the surface, so as not to slow down the advance of the vehicle by anything more than negligible or no amount. This means the present invention will not require the vehicle to consume additional energy to advance as compared to the pre-existing surface on which the platform is placed. Plus, when the present invention is installed in high traffic areas, then once a generator within the present invention starts rotating, even less energy from subsequent vehicles will be required to keep and/or advance the rotation of one or more generators, which allows still more electricity to be generated and further decreases the probability that a vehicle will need to consume more energy to advance as compared to the pre-existing surface onto which the platform was placed. Plus, since the present invention will improve/revamp road surfaces, this feature will actually cause vehicle's to advance more efficiently and thus consume less energy as compared to the pre-existing surface. And since each platform of the present invention improves/revamps/covers road surfaces it can save tax payers money, and it also saves vehicle owners money by allowing them to avoid the costs of repairs to their vehicle suspension systems and tires that would otherwise be damaged by pot holed and otherwise damaged roadways. In the present invention, the platform is defined as one or more structures positioned on a surface that contain one or more cavities which contain one or more items; objects will traverse/move/stop on/along said structures without said platforms breaking/buckling under the weight/force of any said object(s) traversing/moving/stopping on/along said one or more platforms because said platforms are designed to accommodate/withstand the force/weight of the objects/traffic of the location(s) where they will be installed. In one embodiment, the platform structures are further designed/constructed to protect the road and extend the life of the road by shielding the road surface from the otherwise direct impact/wear and tear of vehicle tires driving over the road surface, and by spreading the vehicle weight that is pressing directly overhead through the vehicle's tire contact patch contacting the road surface across/over a wider/broader surface area than just the area where a tire contact patch comes into contact with a road surface.

In one embodiment, the very bottom, or very top, or both the very top and bottom of each platform structure fills/occupies an area that is wider/broader/larger than the space/area occupied by one vehicle tire's contact patch where said tire comes into contact with the road surface; additionally, the material and thickness of the structure used for either the bottom, top, or both the top and bottom portion of the platform structure will support the overhead weight that is channeled/routed through one or more vehicle tire's where/when said vehicle tires come into contact with the road surface; additionally, the top cover of the platform will be supported on support structures/areas/items, and said support structures/areas/items must serve to support the overhead weight sitting/standing/traversing on the top of the platform through any vehicle's tires, and will transfer at least some of the said overhead vehicle weight through one or more support structure(s) to a surface/base/foundation/below that distributes/spreads vehicle weight across a surface/base/foundation. In the case of damaged road surfaces, such as but not limited to, surfaces damaged with potholes and/or cracks, said damages will be covered by the platform of the present invention so that damaged road surfaces will no longer be encountered by vehicles or objects, because said vehicles or objects will instead move/travel along a platform structure that provides a level and unbreakable/durable/lasting surface.

In one embodiment the power generating apparatus can be configured to generate electrical power by converting either downward, upward, forward, backward, or any combination of the aforementioned motions/forces into rotational motion. In one embodiment, the power generating apparatus captures mechanical energy, via a downward motion channeled through a rotational mechanism, and converts the captured mechanical energy into electricity that can be used for different applications. In one embodiment torque is exerted upon at least some item associated with the platform(s) by the moving weight of object(s) such as but not limited to a vehicle's tires affixed to the vehicle, or people, as they traverse across the top of the platform(s). The platforms are placed on any surfaces, for example, road surfaces, highways, streets, etc. and allow the object's moving on the platform to operate in their same customary/normal activity.

In one embodiment, the power generating apparatus comprises one or more or any combination of platforms, protrusions, generators capable of producing electricity, flywheels/mechanical energy storage element(s), bearings. In one embodiment, the platforms are configured to be laid on top of a surface and easily allow an object, for example a vehicle's tires to traverse over it without slowing down the vehicles/objects by anything more than negligible levels or causing them to consume more energy as compared to the pre-existing surface onto which the platform was placed. In one embodiment the platforms should be affixed/secured together and/or to the surface to prevent hazards resulting from the shifting/movement of said platforms. In one embodiment the platforms should be capable of even supporting the weight of rush hour traffic that is stopped or passing over the platforms, without breaking or damaging the platforms. In one embodiment, each platform has unique identifier(s) that differentiate the identification of any platform and/or groups of platforms from other platforms and/or groups of platforms. In one embodiment, the surface is any surface, such as but not limited to, streets, roads, avenues, paths, highways, expressways, freeways, thruways, bridges, tunnels, toll areas, interstates, superhighways, turnpikes, arteries, parkways, on-ramps, off-ramps, tunnels, bridges, sidewalks, walkways, paths, trails, and floors. In one embodiment, the protrusions are positioned upward and/or angled and move through full or partial apertures/holes located in/through a top portion of the platform, and through guides inside the platform and/or not through guides inside the platform structure. In one embodiment, one or more or any or any combination of platform(s), support structures inside the platform(s), components of the platforms(s) are configured to be leveled/aligned using one or more shims and/or one or more leveling members. In one embodiment, each protrusion is configured to depress and/or move downward and upward via at least one reset member and through one or more apertures or holes located in/through a top portion of the platform when the object such as a vehicle's tire(s) strikes a protrusion. In one embodiment an object can strike/push/depress at least one protrusion at a time, and/or in succession, and/or more than one protrusion at the same time, and/or any of the aforementioned. In an exemplary embodiment, the one or more protrusions associated with one or more platform(s) is/are designed/constructed to move/compress into/through the apertures of the platform only when the said protrusions are placed under a force that is less than and/or equal to the force that is applied to the area(s) adjacent/around/surrounding the protrusions protruding above the top of the platform where at least one vehicle tire and/or object contacts said protrusion. In one embodiment the protrusions associated with one or more platform(s) are design to compress/move when exposed to a force that is less than or equal to a predetermined PSI (Pounds per Square Inch) or equivalent measurement. In one embodiment the protrusions associated with one or more platform(s) are design to compress/move when exposed to a force that is greater than or equal to a predetermined PSI (Pounds per Square Inch) or equivalent measurement. In one embodiment, the protrusions and/or a apertures at the top of the platform are located only in locations that have a significant probability that said protrusions will interact/contact with passing overhead objects/tires.

In one embodiment, one or more protrusions are configured to move through/into one or more full or partial aperture(s)s, and slide through/within one or more guides. The guide(s) direct the motion of the protrusion(s). In one embodiment a guide incorporates one or more stops/brakes such as but not limited to a locking pin, brake ring, stopper, member, device, and/or the combination thereof. In one embodiment, the stop/brake for example, a pin is positioned inside the slits/channels of a guide. After an object has passed over a protrusion and a reset member decompresses, then the protrusion will be forced to stop at the reset position by means of one or more brakes/stops, for example, a pin. In one embodiment, the object(s) could be, but are not limited to, the tires of vehicles, such as but not limited to cars, trucks, buses, SUVs, semi-trucks with trailer, semi-trucks without trailer, tractor trailers, trailers, RVs, campers, limousines, cabs, vans, motorcycles, scouters, and/or, any other objects that convey and/or transport a person, persons, goods, or materials, and/or people.

In one embodiment, teeth are incorporated and/or affixed to at least part of one protrusion and said protrusion is connected in an operative manner to one or more shaft(s) via a gear, thereby rotating the one or more shafts by converting downward pressing motion of the one or more protrusions to rotational motion of one or more shafts; additionally, when the protrusion reverses and resets upward the one way rotation of the one or more shafts is undisturbed because in one embodiment said one or more shafts is/are affixed/coupled to one or more one-way bearing, sprag clutch bearing, freewheel clutch bearing, ratchet system, similar/comparable one-way rotation mechanism. In one embodiment, each aforementioned gear is affixed to or incorporated with at least any one of a one-way bearing, sprag clutch bearing, freewheel clutch bearing, ratchet system, similar/comparable one-way rotation mechanism. In one embodiment, the generator is coupled directly to the flywheel or part of the flywheel or vice versa. In another embodiment, the generator is coupled indirectly to the flywheel or vice versa. In one embodiment the generator incorporates a flywheel. In one embodiment the generator and/or flywheel is/are coupled to a shaft which can be rotated and said shaft is coupled to one or more or any or any combination of gearbox, gear train, planetary gear, bearing, one-way bearings, shaft, universal joint, for the purpose of generating electrical power by converting the downward motion of one or more protrusions into rotational motion of one or more generators. In one embodiment, each generator and flywheel could be either separated, combined together, or a combination of both. In one embodiment, each said generator and/or flywheel is secured to one or more or any or any combination of shaft, gearbox, bearing, and universal joint. In one embodiment, the one or more shafts may be one or more or any or any combination of round shafts, D shafts, multi-sided shafts, and are connected to one or more or any or any combination of the generator(s), flywheel, pulley, roller, sprocket, bearing, one-way bearing, sprag clutch bearing, freewheel clutch bearing, ratchet system, gear, gearbox, to transmit torque using one or more connectors, wherein the one or more connectors are any connectors or combination of connectors, such as but not limited to keyway and machine key, spline, set screw, adhesive, latch, clasp, clips, wires, welding, band, crimp, soldering, brazing, dowel, clamp, nut, bolt, screw, pin, split pin, tie, strap, clamp, rivet, threaded shaft, press fit, shoulder, sleeve, socket, other connector(s)/coupler(s). In one embodiment, the shafts are connected to one or more or any or any combination of components include the generator, flywheel, pulley, roller, sprocket, bearing, one-way bearing, sprag clutch bearing, freewheel clutch bearing, ratchet system, gear, gearbox, to transmit torque, wherein the said components are prevented from slipping/moving out of their predetermined positions/locations as a result of rotation and/or vibration, via any constraints affixed to the shaft and/or components and/or both; wherein the constraints include one or more or any or any combination of constraint including but not limited to stop, brake, lock, set screw, welding, band, an adhesive, latch, clip, wire, crimp, solder, brazing, dowel, clasp, tie, strap, clamp, rivet, threaded shaft, retaining ring, a press fit, shoulder, other restraint, other constraint. In one embodiment, any of the one-way bearing, sprag clutch bearing, freewheel clutch bearing, ratchet system, and similar/comparable one-way rotation mechanism are configured to provide a continuous one direction rotating torque to drive/rotate the one or more shafts and/or associated components. In one embodiment, the protrusions are configured to be installed on opposite sides of the same shaft, and still rotate the one or more shafts in the same direction. In one embodiment, the gearbox contains a gear train and/or planetary gear(s).

In one embodiment, each platform has one or more cavities inside the platform and a protective cover. In one embodiment, the protective cover comprises at least some non-slip surface or surfaces on an upper exterior section to assist object(s) for traversing/traveling/moving on the top of said platform. In one embodiment, the protective cover comprises at least some non-slip texture on at least some upper exterior section to prevent objects from slipping when they traverse/travel/move on/along the top of said platform. In one embodiment, the platforms further comprise sloping/inclining/declining/ramp surfaces around outside exterior sides of the one or more platforms, where the sloping/inclining/declining/ramp surfaces bridge the top sides of the platforms to the surface for smooth traveling of an object and/or vehicles on and off said platforms, and said sloping/inclining/declining/ramp surfaces are unnecessary to bridge the tops of adjoining or near adjoining platforms in the areas where the tops of more than one platform adjoin or nearly adjoin, and/or in other situations. In one embodiment, one or more or a group of platforms is/are equipped with one or more or any or any combination of sensor(s), meter(s), gauge(s) used to detect/read/register one or more or any or any combination of current (amps), voltage (volts), other electrical data, other performance input(s)/data from the one or more or any or any combination of generator(s), flywheel(s), other platform components/contents. In one embodiment, the input from said one or more or any or any combination of, but not limited to, sensor(s), meter(s), gauge(s)s are accessed locally. In another embodiment, the input from said one or more or any or any combination of, but not limited to, sensor(s), meter(s), gauge(s) are reported/accessed remotely. In another embodiment, the input from said one or more or any or any combination of, but not limited to, sensor(s), meter(s), gauge(s)s can be accessed locally and/or remotely; additionally the data can be communicated via wireless or wired transmission, or both. In one embodiment the present invention uses one or more or any or any combination of sensors, digital inputs, analog inputs, motion sensors, meters, gauges, other inputs, to gather/capture/read/record/monitor data generated by said items/inputs used in the present invention and said data can be used to manage/measure/make decisions about one or more items composing the present invention. In one embodiment, the data captured/gathered/read/recorded/monitored by said sensors, digital inputs, analog inputs, motion sensors, other inputs, can be transmitted to one or more central or distributed locations via conductors and or wirelessly and or a combination thereof. In one embodiment the data transmitted can be used to automatically determine/report/highlight specific performance data of one or more and/or groups of items within the present invention; and even the location or groups of locations of items being reported on within the present invention. In one embodiment a computer and/or Programmable logic controller (PLC) can be used to capture the data and make decisions and execute decisions based on pre-programmed stored set(s) of rules and/or alert one or more individual with or regarding specific data and even what actions to take based on said data. In one embodiment one or more computers and/or PLC can do one or more or any or any combination of turn off, turn on, raise, lower, increase, decrease, initiate another action, relating to one or more items/components/fixtures/switches/etc. of the present invention based on pre-programmed stored set(s) of rules/instructions and/or execute greater or lesser complex responses/tasks. In one embodiment one or more computers and/or PLCs can perform simple and/or complex calculations. In one embodiment the PLC is located on or near the location/area of the one or more or network of platforms. In another embodiment the computer(s) PLCs can be located at on-site location(s), off-site location(s) and/or both on-site and off-site locations. In one embodiment the PLC/Computer is located in a temperature controlled environment/facility/structure. In one embodiment the one or more or any or any combination of sensors, digital inputs, analog inputs, motion sensors, meters, gauges, other inputs, collectively called INPUT DEVICES, that are used to gather/capture/read/record/monitor data can be located/situated/positioned in one or more or various locations in the present invention and associated with one or more items throughout the present invention. In one embodiment the INPUT DEVICES monitor/read/gauge/sense the performance of one or more or any or any combination of: individual generators, groups of generators, power generating mechanisms, groups of power generating mechanisms; energy storage units/batteries; temperature of one or more items and/or locations associated with one or more platforms, one or more inverters, one or more rectifiers, one or more diodes, one or more heating items, one or more switches, fuses, circuit breakers, other items. In one embodiment each INPUT DEVICE is associated with one or more unique identifiers/identification numbers and or additional unique data as to the location of the INPUT DEVICE in the present invention.

In one embodiment, the top/cover structure of the platform structure, and the platform structure, is/are designed/constructed so that when vehicle tires roll over head, the tires will roll with the same or less resistance/friction/drag across said platform cover/structure as compared to the resistance encountered by said tire(s) if/when said tire(s) were to roll over the road surface before the platforms and associated platform covers were to be installed. In one embodiment, the platform structure includes the top or cover of the structure, which is/are designed to provide for the smooth travel of vehicles that is as good as or better than the original surface where the platform structures is/are now placed on. In one embodiment, the platform structure and/or the associated top of the platform where vehicle tires roll over are constructed of such material and thickness and design, and/or supports so as to remain rigid when vehicle tires roll over it/them at the moment of impact by any vehicle tires, and said platform will not be displaced from its installed position when vehicle tires roll over head. In one embodiment said platforms are securely installed on a surface and/or inside a surface. In one embodiment, said platforms are secured to a surface or inside a surface so they are not easily disturbed by weather, extreme weather, tornadoes, hurricanes, floods, rain storms, or other known perils. In one embodiment the one or more, and/or interconnected platforms, and/or network of platforms are designed to be secured to the road and/or inside the road, and/or immobilized in or on the road so that the platforms do not move out of their predetermined location as a result of contact by vehicle tires or other objects interacting/traversing/contacting them. In one embodiment, one or more platform(s) are connected to a road with any one or more or any connector including but not limited to pins/bolts/bars/shafts/rods or other objects. In one embodiment, when a group of platforms is installed in a group, a dedicated connector/fastener may or may not be used/required for each individual platform; one connector/fastener may be shared by multiple platforms. In one embodiment, the connector/fasteners are affixed to or are part of the on/off sloping/ramp structure(s) that connects the top of a platform to a surface/road, which is/are used to facilitate the smooth transfer of vehicles between the top of the platforms and the road surface.

In one embodiment, the protrusions are at least any of, but not limited to, shafts, rods, poles, strips, bars, pistons, levers, bump, bulge, lever, switch, handle, fixtures, other items. In another embodiment, the protrusions are at least any of, but not limited to, shafts, rods, poles, strips, bars, pistons, levers, and/or fixtures that are affixed to, and/or incorporated with one or more tooth/teeth, gear(s), gear rack(s), pulley(s), roller(s), sprocket(s), lever, components of said items, and/or any combination thereof. In one embodiment, each guide of/associated with the protrusion is configured to guide/direct the motion/positioning/re-positioning of one or more or any or any combination of: the protrusion(s), the reset member(s). In one embodiment, each guide of/associated with the protrusion is configured to hold the protrusion(s) and/or reset member(s) in proper location(s)/position(s). In one embodiment, the gear(s) can be any gears such as but not limited to cylindrical gear(s), spur gear(s), helical gear(s), gear racks(s), rack gear(s), pinion gear(s), rack and pinion gear(s), bevel gear(s), miter gear(s), worm and worm gear(s), screw gear(s), internal gear(s), gear train(s), planetary gear(s), epicyclic gear(s), linear gear(s), item(s) with teeth, and/or any combination thereof.

In one embodiment, the reset member is at least any one of an elastic member, spring or springs, elasticized cord or cords, pulley and counter weight system, lever and fulcrum, similar mechanisms. In another embodiment, the reset member is comprised of repelling magnets. In another embodiment, the reset member is a compression device and/or comprised of fluids and/or gases that compress when force is applied, and decompress when the force has passed. In one embodiment, the guides are made of a material that includes a ferrous material, or a non-ferrous material, and/or the combination thereof. In one embodiment, each reset member is located at a bottom portion of each protrusion and securely positioned. In another embodiment, each reset member is located at a top portion of each protrusion and securely positioned. In one embodiment, the reset member is configured to quickly deposition/decompress the protrusion to its original state when the object passes away from the protrusion. In one embodiment, a holder/item is configured to prevent the reset member from dislocating/disconnecting, and/or bulging outward when the protrusion is decompressed by the object.

In another embodiment, a protrusion is positioned within the channel of a guide and slides within said channel and the protrusion is reset via elasticized cords/members. In one embodiment the protrusion is configured to depress and/or move downward via the weight of the overhead object and back upward via the elasticized cords/members and through one or more apertures or holes located in/through a top portion of the platform when the object, for example, a vehicle's tire(s), strikes/pushes/depresses one or more protrusions at the same time and/or in succession. In one embodiment, the elasticized cords/members are securely affixed to one or more sides of the guide or to other items inside the platform and are configured to move up/down/up and quickly reposition the protrusion to its original state when the object, for example, a vehicle's tires, move away from the protrusion. In one embodiment, the elasticized members are affixed/fastened/connected to a surface to keep them from dislocating. In one embodiment each guide is configured to guide/direct the motion/positioning/re-positioning of the protrusion(s) and the reset members and also hold the protrusion(s) and the reset members in their proper location(s)/position(s).

In another embodiment, the protrusion is a shaft that can slide through a guide and is directed within the guide and incorporates a reset member. In one embodiment the protrusion is affixed to a shaft and/or lever. In another embodiment, at least a portion of a protrusion is a shaft positioned inside/within a reset member, for example, a spring, and thus prevents the spring from bending/bulging outward while still allowing the reset member to compress freely. In one embodiment, the protrusion is secured to a surface using one or more connector/fastener of any type including but not limited to adhesives.

In one embodiment, the underside of the protective cover incorporates/integrates one or more resistive conductors and/or the platform incorporates heating object(s) for melting ice and/or snow to prevent them from accumulating on the platform. In one embodiment, the one or more resistive conductors and/or heating object(s) are affixed or integrated into, but not limited to, the protective cover or other area(s) of the platform. In some embodiments, the resistive conductors and/or heating object(s) are affixed or integrated to, but not limited to, an underside of the protective cover. In one embodiment the one or more resistive conductors and/or heating object(s) are affixed to another location or locations associated with the platform. In one embodiment, the resistive conductors and/or heating object(s) heat up on the flow of electric current to melt the snow and/or ice that would otherwise accumulate on the platform. In an exemplary embodiment, the resistive conductors and/or heating object(s) could be connected to, but are not limited to, insulated and/or non-insulated electric conductor(s) that provide electric current to the said resistive conductors and/or heating object(s).

In one embodiment, each platform further comprises a lubrication system configured to lubricate the components of the electrical power generating apparatus using one or more or any or any combination of a conduit, a channel, a hose, a duct, a vein, and a tube, wherein each platform further comprises one or more entry and/or exit port(s) inside and/or outside of the platforms through which lubricant is applied by one or more or any or any combination of filling, pumping, draining, flushing, and/or transferring the lubricant. In one embodiment, the power generating apparatus further comprises one or more or any or any combination of energy storage devices and/or systems comprising capacitor(s), and/or battery(s), other energy storage devices, which are used to store the electricity/power produced by the generators in one or more platforms, wherein said capacitor(s), batteries, other energy storage devices, are located inside and/or outside the platform and connected to one or more platforms.

Other objects, features and advantages of the present invention will become apparent from the following detailed description. It should be understood, however, that the detailed description and the specific examples, while indicating specific embodiments of the invention, are given by way of illustration only, since various changes and modifications and combinations within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

A description of the embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is therefore indicated by the appended claims rather than by the foregoing and subsequent descriptions. All changes that come within the meaning and range of equivalency of the claims are to be embraced within their scope.

Figure 1:
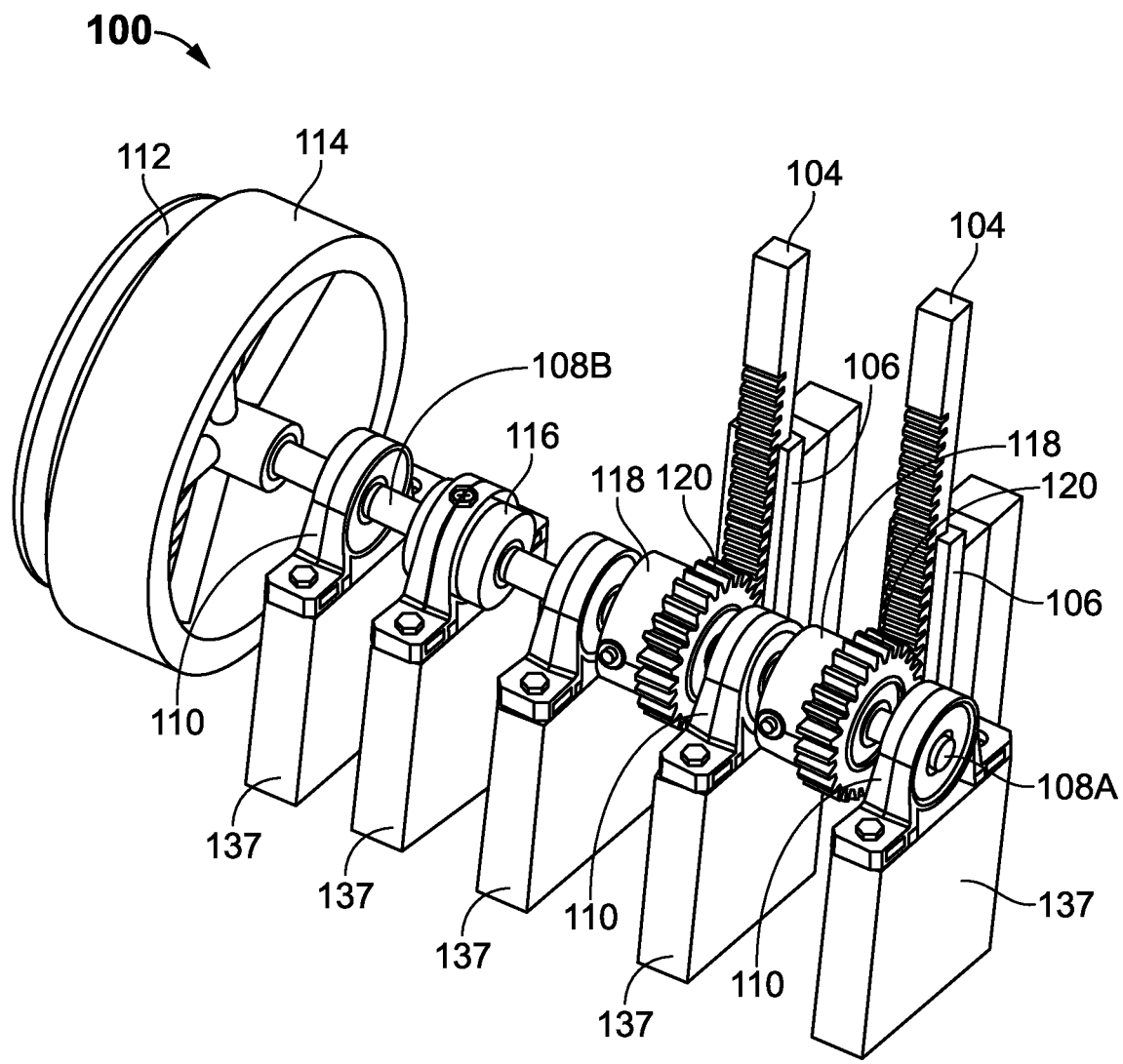
FIG. 1 shows a perspective view of one of a number of electrical power generating apparatuses largely located inside a platform, in an embodiment of the present invention.

FIG. 1 discloses one electrical power generating apparatus 100 located largely inside one or more platforms in one embodiment of the present invention. Additionally, in one embodiment a number of said power generating apparatuses 100 can be located in a platform 122. In one embodiment, the power generating apparatus 100 is configured to generate electrical power by converting mechanical energy into electrical power using a generator 112. In one embodiment, the power generating apparatus 100 captures mechanical energy, via a protrusion 104 that moves in a linear/angled downward/downward-upward motion, which is then converted into rotational motion when said protrusion 104 interacts with a gear 120 and said rotational motion is used to rotate a generator 112 which converts the captured mechanical energy into electrical energy for use in different applications. In one embodiment the force/weight exerted upon the protrusion 104 by the moving or stopped weight of vehicles through their tires, and/or objects in the course of their customary activity will be harnessed by this power generating apparatus 100 which is located largely inside a platform. In one embodiment the actual size of the power generating apparatus 100 could vary and could be smaller or more compact, or larger, and it/they fit largely inside and/or outside the platform 122.

In one embodiment, the power generating apparatuses 100 are located largely inside one or more platforms and the top of the platform 140 (shown in FIG. 2), and one or more protrusions 104, and one or more generators 112 and one or more flywheel/mechanical energy storage element 114 are incorporated into the power generating apparatus 100. In one embodiment, the platforms 122 are configured to be laid on top of a surface and are configured to allow an object, for example vehicle tires, to pass/traverse/drive over the top of the platform 140 in the course of their customary activity. In one embodiment in the case of multiple platforms used in the same general area, the platforms 122 should be affixed/secured together and/or to the surface to prevent hazards otherwise resulting from the shifting/movement of said platforms 122. In one embodiment, each platform 122 has one or more unique identifier(s) that differentiate the identification of any one or more platforms or items associated with a platform from other one or more platforms or items associated with the one or more platforms, and said unique identifier(s) are associated with said platforms either physically, digitally, or both. In one embodiment, the surface is any surface, such as but not limited to, streets, roads, avenues, paths, highways, expressways, freeways, thruways, bridges, tunnels, toll areas, interstates, superhighways, turnpikes, arteries, parkways, on-ramps, off-ramps, tunnels, bridges, sidewalks, walkways, paths, trails, and floors. In one embodiment, the protrusions 104, 103 are vertical and/or angle and move within the platform 122 using one or more guides 106. In one embodiment, each protrusion 104 is configured to depress and/or move downward and upward via a reset member 126, 130 (shown in FIGS. 2, 3, 4, 5, 16A, and 16B) and through one or more apertures or holes located in/through a protective cover 140 of the platform 122 when the object strikes or pushes the one or more protrusions 104 at the same time, in succession, and/or any combination thereof. In one embodiment, one or more protrusions 104, 103 are configured to move through one or more aperture(s)/holes 142, and slide through/within one or more guides 106. In one embodiment the guide(s) 106 direct the motion/direction of the protrusion(s) 104. In one embodiment, the upper surface of the one or more protrusions 104 is a non-slip surface. In one embodiment, at least one brake/stop 124 (shown in FIG. 2) and 136 (shown in FIG. 5) could be a pin or locking pin, or some type of stopper and/or the combination thereof, which are used to prevent the protrusions 104 from escaping the guide 106. In one embodiment the brake/stop 124 moves within/inside/through slits/channels 107 of the guide. In one embodiment the brake/stop 124 is secured to the bottom of the protrusion/vertical shaft 134 (shown in FIG. 5). In one embodiment, the brake/stop 136 (shown in FIG. 5) is secured to the bottom of the vertical shaft/protrusion 134. In one embodiment, the objects that strike the protrusions 104, 103 are, but do not have to be limited to, the tires of vehicles, and in another embodiment, the objects are people.

In one embodiment, at least some part of any of the platform structure, including but not limited to the base, walls, cover/top, are composed of material containing ferrous. In one embodiment other non-ferrous materials and/or a combination of materials containing or not containing ferrous are used in at least some part of the platform structure. In one embodiment the structure of one or more platforms 122 is similar to that of a chest/box/container. In one embodiment, a group of chests/boxes/containers of one or more sizes/dimensions is grouped together and or affixed/joined/bolted/fastened/connected together to form a larger group/network of platforms/chests/boxes/containers as shown FIG. 18. In one embodiment, when bolts or bolt like items are used to affix/join/bolt/fasten/connect together platform structures to form a group of more than one platform and/or a larger networks of platforms (shown in FIG. 18), one or more or any or any combination of connectors can be used and if bolt or bolt like items are used they can be combined with any one or more item including but not limited to: washers, springs, belleville washer, coned-disc spring, conical spring washer, disc spring, nuts. In one embodiment, the connecting bolts may be made of materials that contain ferrous. In one embodiment the said bolts are rod like structures. In one embodiment, the bolts/rods that connect the platforms together can be placed/located anywhere inside, outside, or both inside and outside one or more platforms and they can be of any length, width, size, or shape. In one embodiment, the rods/bolts are used to provide rigidity, support to the platform structure. In one embodiment, platforms 122 are interconnected together without bolts/fasteners. In another embodiment platforms 122 can be interconnected together both with and without bolts/fasteners. In one embodiment some benefits of combining smaller structures together to form a combined larger structure is the simplicity of manufacture/shipping/installation/repair/etc. of smaller structures; plus, smaller/compact structures are more crush resistant that larger structures while requiring less material. In one embodiment, the platforms/chests/boxes/containers 122 are laid on a surface; in another embodiment said platforms/chests/boxes/containers 122 are laid inside a road. In one embodiment, one or more platforms 122 and or platform components are equipped with handles/nubs and/or fixtures comparable to handles that can be used at least in part for the grasping by humans and/or machinery/equipment to handle/move/install/remove/adjust said platform 122 and or platform components. In one embodiment, at least some portion of the one or more platforms 122 are designed to contour to the crown of the road. In one embodiment, the platforms/chests/boxes/containers 122 of smaller size structures can be combined together to contour to the crown of the road to a sufficient degree that they allow vehicle tires to move without impediment. In one embodiment, the platforms 122 are designed with expansion joints to accommodate the expansion/contraction of the platforms as a result of exposure to various temperatures. In one embodiment, the smaller length/width/size platforms 122 are combined/affixed together in such a manner as to allow the platforms 122 to expand/contract depending on temperature and/or temperature changes without causing the platforms 122 to warp and/or detach from their location and/or rise or fall so as to otherwise cause platforms 122 to become uneven and impeded the smooth movement of vehicles in some way and/or even cause injury or damages in some way.

In one embodiment, one or more or any or any combination of items/fillers of any kind, such as but not limited to cement, concrete, asphalt, stone, gravel, fiberglass, plastic, shim, ferrous, paste, liquid, other, is applied to at least some portion of a surface/base upon which at least part of one platform 122 will be positioned, in order to fill in/patch/restore/repair/prepare the surface/base upon which at least part of at least one platform 122 will be positioned. In one embodiment said one or more item/filler may fill in dips, valleys, holes, cracks, ruptures, other imperfections in the surface, and or level out the road surface and/or prepare the road surface in order to provide an improved/level/solid/stable/firm foundation for the underside/base/foundation of one or more platforms or sections of platforms so that when a vehicle's tires roll over the top 140 of the platform 122 structure, said tires will roll over a smooth/level/even surface. In one embodiment, one or more shims are used in conjunction with said one or more fillers/items to levelize the bottoms/base and/or tops of the platforms. In one embodiment, the one or more filler/item and the one or more shim are the same.

In one embodiment, the platforms 122 laid on a surface contain push force to rotation force device(s)/item(s)/mechanisms (combination of 104, 120, 108A, 108B in FIGS. 1-5 and combination of 103, 105, 118 in FIGS. 16A and 16B) and the energy released by passing overhead objects/vehicle tires is harnessed to rotate/power the one or more or any or any combination of generator 112, flywheel 114, gearbox 116, other items, in one or more nearby/different/separate/other platforms 122. For example, in one embodiment, in a scenario of roadways with multiple lanes, one or more of the platforms 122 upon which objects/vehicle tires pass/traverse are used to harvest the energy released by passing overhead objects/vehicles and then transfer said energy to the one or more or any or any combination of generators 112, flywheels 114, gearboxes 116, other items, located in/with other/different/separate platforms/structures, and in this embodiment one or more shafts/bars, such as but not limited to, round shafts, D shafts, mufti-sided shafts, other shafts or shaft like devices transfer the power from one or more platforms 122 where the energy was harvested and transfer it to the power generating mechanisms (combination of 108A, 108B, 112, 114 in FIGS. 1, 10 and combination of 112, 116 in FIG. 29 located in one or more other/different/separate platforms/structures. This aforementioned or similar embodiment requires or could require the use of fewer generators 112, flywheels 114, gearboxes 116, other items, and thus lowers the overall cost of the power generating apparatus and/or maximize the run time and utilization of fewer generators 112, flywheels 114, gearboxes 116. In many locations, vehicle traffic is most significant/pronounced is moving in one direction during one section of the day, and most significant/pronounced in moving in an opposite direction during other parts/sections of the day, such as rush hour traffic moving in one direction at the start of the day, and rush out traffic headed in the opposite direction at the end of the day; in which case platforms can be placed on the lane surfaces running in each/multiple directions, but the actual generators 112, flywheels 114, gearboxes 116, other items that generate electricity/power do not need to be contained/located in platform on all the lanes; but in some embodiments the platforms 122 only require limited items/fixtures such as but not limited to overhead protrusions, levers (103, 104, 105, 184) and push force to rotation force mechanisms (combination of 108A, 108B, 118, 120). Then in one embodiment said protrusions, levers (103, 104, 105, 184) and or push force to rotation force mechanisms (combination of 108A, 108B, 118, 120) from one platform can channel the rotational energy to other platform/structure 122 that contains generators 112, flywheels 114, gearboxes 116, other items via shafts/bars/items. In one embodiment, one or more universal joints are used to connect/join shafts/bars/items.

In one embodiment, at least a portion of a top surface 140 of a platform 122 on which vehicle tires roll/traverse is comprised of a surface that is one, or more, or any, or any combination of the following, as compared to at least some portion of the pre-existing surface on which the platform 122 was installed and where vehicle tires would otherwise traverse if said platform 122 was not installed; a portion of the top platform surface is flatter, a portion of the top platform surface is more rigid, a portion of the top platform surface has less area that a tire's contact patch comes into contact with, a portion of the top surface of the platform 122 has less or equal rolling resistance/friction/drag.

In one embodiment, at least a portion of the top surface 140 of the platform 122 has less top surface area for at least some of the tire's contact patch to come into contact with; and in one embodiment the less surface are is because at least a portion of the top surface 140 is comprised of a rigid flat structure with one, or more, or any, or any combination of some lowered indentations, cuts, pits, cavities, full or partial holes or apertures, grating, open grid structure, open grid area, other surface removal. In one embodiment, the material used on at least a top portion of the top surface 140 of the platform 122 produces lesser or equal resistance/friction/drag to a tire as compared to the pre-existing surface on which the platform 122 was positioned where vehicle tires would otherwise come in contact with if said platform 122 was not installed.

In one embodiment, the protrusions (103 and 104) that protrude up thru the apertures 142 located in a top section 140 of the platform 122 also protrude up through at least one other additional structure. In one embodiment, the top cover 140 of the platform 122 is associated with at least an additional structure that a vehicle's tires come into contact with and the two or more structures are either at least partially combined.

In one embodiment, teeth are incorporated and/or affixed to at least a portion of one protrusion 104 and said protrusion 104 is connected in an operative manner to a shaft 108A via a gear 120, thereby rotating the shafts 108A, 108B by converting the linear/angled downward/downward-upward motion of the one or more protrusions 104 to rotational motion; additionally, in one embodiment when the protrusion 104 reverses and resets upward, the one-way rotation of the shaft 108A is unhindered because said shaft 108A is affixed/coupled to at least one one-way bearing, and/or sprag clutch bearing, and/or freewheel clutch bearing, and/or one-way clutch, and/or ratchet system 118. In one embodiment the protrusion(s) 104 and components connected in an operative manner to the protrusion(s) 104 are constructed of material(s) that withstand/endure the powerful forces and torque applied to said protrusions 104 and components, without breaking. In one embodiment, the protrusion(s) 104 are constructed of at least some materials containing ferrous. In one embodiment, one-way bearing, and/or sprag clutch bearing, and/or freewheel clutch bearing, and/or one-way clutch, and/or ratchet system 118 is affixed to and/or incorporated into the gears 120. In one embodiment, the generator 112 is coupled to the flywheel 114 via a shaft 108B. In one embodiment, the flywheel 114 is incorporated with the generator 112. In one embodiment, the flywheel 114 is not incorporated in the design/invention. In one embodiment, a gearbox 116 is positioned or stationed between the 2 shafts (108A and 108B) in order to accelerate the revolution per minute (RPM) of the one or more generators 112, flywheels 114, shafts 108B, or any combination thereof. In one embodiment, the gearbox 116 is affixed/integrated to/with the generator 112, and/or flywheel 114, or both. In one embodiment, a gear 120, or gear teeth are incorporated and/or affixed to the flywheel 114 and/or the outside diameter of the flywheel 114 and a protrusion 104 can interact with the said gear 120 or gear teeth associated with said flywheel 114 to convert the overhead pushing force of an object into the rotational force of a flywheel 114 and the flywheel can be affixed to a shaft 108A, 108B that can be affixed to one or more or any or any combination of generator 112, gearbox 116, bearings 110, flywheel 114, and other items. In one embodiment, a gear 120, or gear teeth are incorporated and/or affixed to the generator 112 and/or the outside diameter of the generator 112 and a protrusion 104 can interact with the said gear 120 or gear teeth associated with said generator 112 to convert the overhead pushing force of an object into the rotational force of a generator 112 and the generator 112 can be affixed to a shaft 108A, 108B that can be affixed to one or more or any or any combination of flywheel 114, gearbox 116, bearing 110, other items. In one embodiment, the horizontal shafts (108A, 108B) run through the bearings 110 and/or at least one one-way bearing, and/or sprag clutch bearing, and/or freewheel clutch bearing, one-way clutch, and/or ratchet system 118. In one embodiment, electrical power is generated by converting the linear/angle, downward/downward-upward motion of one or more protrusions 104 into rotational motion that rotates one or more flywheels 114 and generators 112. In one embodiment, the one-way bearings, and/or sprag clutch bearings, and/or freewheel clutch bearings, and/or one-way clutch, and/or ratchet system 118 are configured to provide a continuous one direction rotating torque to drive the shafts (108A and 108B). In one embodiment, the one or more generators 112 positioned/located inside the platform(s) 122 is/are composed of one or more rotors and/or one or more stators. In one embodiment, at least one flywheel 114 incorporates a gear and/or at least one one-way bearing, and/or sprag clutch bearing, and/or freewheel clutch bearing, one-way clutch, and/or ratchet system 118. In one embodiment, at least one combined flywheel 114 and generator 112 incorporates a gear 120 and/or at least one one-way bearing, and/or sprag clutch bearing, and/or freewheel clutch bearing, one-way clutch, and/or ratchet system 118. In a preferred embodiment, the gearbox 116 is immobilized in its position so that the input shaft/item 108A is able to transfer torque through the gearbox 116 onto the output shaft via the gears inside the gearbox 116; and the one or more connectors/fasteners that immobilize the gearbox 116 are capable of enduring/withstanding the powerful input and/or output torque and stresses being placed on the gearbox 116 in order to prevent the gearbox 116 itself from rotating along with the gears inside the gearbox 116.

In an exemplary embodiment, at least one stator of each generator 112 is secured/immobilized inside a platform 122 so that at least one rotor of said generator 112 rotates around and/or near the at least one said stationary stator of said generator 112 in order to generate electricity. In one embodiment the stator contains insulated/conductor coils and the rotor contains magnets. In another embodiment the stator contains magnets and the rotor contains insulated/conductor coils. In one embodiment, the magnets associated with the generators 112 used in this invention are configured to rotate near and/or around the conductor/insulated coils. In another embodiment, the conductor/insulated coils rotate near and/or around the magnets. In another embodiment, a combination of at least some magnets rotate near and/or around the conductor/insulated coils and at least some conductor/insulated coils rotate around some magnets.

In one embodiment, the protrusions 104 are further configured to be installed on opposite sides on the same shaft 108A/108B and still rotate the shaft in the same one direction. In one embodiment, the gearbox 116 contains one or more or any combination of gears, one or more gear trains and/or one or more planetary gear(s). In one embodiment, the gearbox 116 contains lubricant to lubricate the gears. In one embodiment, when a protrusion 104 reverses/resets back to its start/reset/original position, the one-way bearing, and/or sprag clutch bearing, and/or freewheel clutch bearing, and/or one way clutch, and/or ratchet system 118 will not halt or hinder the ongoing one-way rotation/spin of the horizontal shafts 108A and 108B.

In one embodiment, the power generating apparatus 100 comprises one or more flywheel(s) 114, which are secured to one or more or any or any combination of shaft, generator, and is/are positioned inside/within the platforms and below the top of the protective cover 140 and/or associated with the platforms 122. In one embodiment the flywheel(s) 114 is/are configured to store mechanical energy generated from rotating shafts 108A, 108B, and said shafts are rotated by converting the linear/angle, downward/downward-upward motion of the one or more protrusions 104 to rotational motion using gears 120 affixed to or incorporated with a one-way bearing, and/or sprag clutch bearing, and/or freewheel clutch bearing, and/or ratchet system 118. In one embodiment the rotation of the flywheel(s) 114 will power/move/rotate indirectly or directly one or more or any or any combination of flywheel(s) 114, generator(s) 112, shaft(s) 108A, 108B, torsion object(s), gear(s), other item(s). In one embodiment, the aforementioned downward pushing force through a protrusion 104 first rotates and/or passes through gear(s) 120, gearbox(es) 116, which magnify/accelerate the revolution per minute (RPM) used to power/move/rotate indirectly or directly one or more or any or any combination of gear(s), shaft(s) 108A, 108B, flywheel(s) 114, generator(s) 112, torsion object(s), other item(s). In one embodiment, one or more flywheel(s) 114 is/are affixed directly and/or indirectly to one or more or any or any combination of shaft(s) 108A, 108B, gear(s) 120, bearing/bushing/sleeve/roller(s) 110, and generator(s) 112. In one embodiment, the energy of one or more rotating flywheel(s) 114 is tapped into/accessed/used at any time, including but not limited to, any of the following or any combination of the following: when the flywheel(s) 114 reach a specific RPM; when the flywheel(s) 114 are fully charged and/or partially charged; when/after one or more predetermined event(s) have occurred; at/after/before specific time periods;

at/after/before different/inexact time periods. In one embodiment the power generating apparatus 100 shows the flywheel 114 and generator 112 in a horizontal position similar to the horizontal position of the shafts (108A and 108B); yet in another embodiment the flywheel 114, generator 112, shafts 108A, 108B and other items could instead be positioned flat, and/or any range of angles inside the platform 122. In one embodiment, each generator 112 and flywheel 114 and/or gearbox(es) 116 could be either separated, combined together, or a combination of both. In one embodiment, each generator 112 and flywheel 114 are secured to one or more or any or any combination of the shafts (108A and 108B), gearbox 116, and the bearings 110.

In one embodiment, the energy harvested/recycled from passing/moving/stopped objects/vehicle tires is used to first rotate/charge one or more flywheels 114 and then energy stored in said flywheels 114 is used to rotate one or more generators 112. In one embodiment, the power generating apparatus 100 could be configured so that the flywheel 114 will automatically discharge its stored energy to rotate one or more generators 112 when the flywheel 114 meets and/or exceeds specific RPM (rotations per minute) and/or the power generating apparatus 100 could be configured to stop discharging energy from one or more flywheels 114 when the speed of one or more flywheels meets and/or drops below specific RPM. In one embodiment, the energy harvested/recycled from passing/moving/stopped objects/vehicle tires is used to both rotate/charge one or more flywheels 114 and one or more generators 112.

In one embodiment, one or more support structures/items 137 are used to elevate and/or support components inside the platform 122. In one embodiment, the support structures/items 137 are securely fastened/connected to the base of the platform 122. In another embodiment, the support structures/items 137 are incorporated into another part/section/areas of the platform structure itself. In one embodiment the support structures/items 137 are made of material(s) that will support the force and stress generated by the ongoing motion of the protrusions 104, and/or one or more or any or any combination of generator(s) 112, flywheel(s) 114, shafts(s) 108A, 108B, gears 120, gearboxes 116. In one embodiment the support structures/items 137 elevate and support one or more or any or any combination of flywheels 114, generators 112, shafts 108A, 108B, gearboxes 116, bearings 110, gears 120. In one embodiment the elevation of said components also allows a protrusion 104 to move a sufficient distance downward and upward while engaging with said components in order to transfer force initially applied to said protrusions 104. In one embodiment because the support structures/items 137 elevate components, they enable the apparatus to accommodate larger diameter flywheels 114, generators 112, and other components while engaging with one or more protrusions 104. In one embodiment the support structures/items 137 also lift the components up off the floor of the platform 122 and thus further protect the components inside the platform 122 from water and/or debris that that may accidentally seep into platform 122 or accumulate at the base of the platform 122. In one embodiment the support structures/items 137 also facilitate the alignment of the shaft(s) (108A and 108B) and components affixed to said shaft(s) (108A and 108B) so that said shaft(s) (108A and 108B) and components will rotate efficiently. In one embodiment, one or more shims will be incorporated and/or affixed to the top, bottom, and/or into of any support structure/item 137 to level said support structures/items 137 and/or any components it is supporting.

In one embodiment, each component is secured/affixed to any portion of the shaft 108A, 108B and is secured/affixed in such a manner that said component is prevented from slipping/moving out of its predetermined position/location as a result of the rotation and/or vibration of any component. So, for example, in one embodiment in the case of a gear 120 secured/affixed to a shaft 108A via a key-way and machine key, said gear 120 could otherwise potentially shift/move to the left or right if one or more or any or any combination of additional constraints were not installed/applied to prevent it from doing so. In one embodiment, one or more or any combination of constraints may be used including but not limited to, press fit, shoulder, one or more stop, brake, lock, set screw, weld, band, adhesive, latch, clip, wire, crimp, solder, brazing, dowel, clasp, tie, strap, clamps, rivets, threaded shaft, retaining rings, and/or other items.

In one embodiment, the protrusions 104, 103 are at least any of, but not limited to; a shaft, rod, pole, strip, lever, bar, piston, bump, bulge, lever, switch, and a fixture. In one embodiment, the protrusions 104 are at least any of, but not limited to, a shaft, rod, pole, strip, lever, bar, piston, bump, bulge, switch, and a fixture with one or more gear(s), gear rack(s), teeth, pulley(s), roller(s), sprocket(s) and any combination thereof incorporated and/or affixed to said protrusions 104. In one embodiment, the back side of the protrusion 104 (the side without linear teeth) will move within/through a guide 106 and said guide 106 will help the protrusion 104 to move properly in its intended route/direction. This will also remove the risk of bending the horizontal shaft(s) 108A, 108B inside the platform 122 that is/are affixed to at least one gear 120 and that interacts with at least one protrusion 104. The location, position of the guide 106 and the aperture 142 of the platform 122 through which the protrusion 104 passes will keep that protrusion 104 moving properly. In one embodiment, the guide 106 is located around one or more parts/section(s) of any protrusion 104. In one embodiment, the protrusions 104, 103 at the top of the platform 122 and/or protruding above the top of the platform 122 interact with contents inside the platform 122. In one embodiment, the protrusions 104, 103 fit inside and through apertures located through the top of the platform 122. In another embodiment, the protrusions 104, 103 may or may not fit inside/through apertures but still engage with levers/bars/shafts/fixtures/piston inside/outside the platform 122 and/or interact with power generating devices/items inside the platform 122. In one embodiment, the protrusions 104, 103 associated with any given platform 122 could be of any one or more or multiple length(s), height(s), width(s), diameter(s), shape(s), and size(s). In one embodiment, the protrusions 103 are affixed to a lever/shaft. In one embodiment, the lever/shaft and protrusion 104, 103 are one component/fixture. In one embodiment, the protrusions 104, 103 are removable. In one embodiment, the one or more protrusions 104, 103 are threaded into/onto a lever/shaft.

In one embodiment, one or more shafts 108A, 108B contain at least some amount of one or more keyway/keyslot and said shaft(s) (108A and 108B) could be connected/affixed via one or more machine key(s) to one or more or any or any combination of generator(s) 112, flywheel(s) 114, pulley(s), roller(s), sprocket(s), bearing(s) 110, one-way bearing, and/or sprag clutch bearing, and/or freewheel clutch bearing, one-way clutch, and/or ratchet system 118, gears 120, gearbox(es) 116, combination of gears, torsion object(s), sprocket(s), and other components/items to transmit torque. In one embodiment, one or more shafts 108A, 108B may be one or more or any combination of round shafts, D shafts, multi-sided shafts, other shaft, and are connected/affixed with one or more or any or any combination of shaft(s) 108A, 108B, generator(s) 112, flywheel(s) 114, pulley(s), roller(s), sprocket(s), bearing(s) 110, one-way bearing, and/or sprag clutch bearing, and/or freewheel clutch bearing, and/or one-way clutch, and/or ratchet system 118, gears 120, gearbox(es) 116, combination of gears, torsion object(s), sprocket(s), universal joints, and/or other components/items to transmit torque by means of one or more or any or any combination of connectors/fasteners, such as, but not limited to, couplers, sleeves, sockets, set screws, adhesives, latches, catches, clips, wires, weld, band, crimp, solder, brazing, dowel, clasp, nut, bolts, screws, pins, split pins, tie, straps, clamps, rivets, keyways and machine keys, spline, a press fit, shoulder. In one embodiment, the rotors/component(s) of one or more or any combination of generator(s) 112, shaft(s) 108A, 108B, flywheel(s) 114, other component(s) inside one or more platform(s) 122 are linked/joined/united/married together using, one or more or any or any combination of the following: one or more chain(s), cable(s), belt(s), gear(s), other member(s). In a preferred embodiment, the connectors/fasteners used throughout the power generating apparatus 100 are constructed of material(s) that withstand/endure the powerful forces and torque applied to the components/items they fasten/connect together, without breaking.

In one embodiment, the gear(s) 120 are any type of gear including but not limited any one of the following: cylindrical gear(s), spur gear(s), helical gear(s), gear racks(s), rack gear(s), pinion gear(s), rack and pinion gear(s), bevel gear(s), miter gear(s), worm and worm gear(s), screw gear(s), internal gear(s), gear train(s), planetary gear(s), epicyclic gear(s), linear gear(s), item(s) with teeth, and any combination thereof. In one embodiment, the gear ratio of one protrusion with gear teeth 104 to one associated horizontal shaft 108A, 108B via a gear 120 is/are different than the gear ratio of any other protrusion with gear teeth 104 to its associated horizontal shaft 108A, 108B via the gear 120. In one embodiment, the gear ratio of one protrusion 104 with gear teeth to any one or more associated horizontal shaft(s) 108A, 108B via a gear 120 are the same as the gear ratio of any other protrusion 104 with gear teeth to its associated horizontal shaft(s) 108A, 108B via the gear 120.

In one embodiment, the one or more aforementioned shafts 108A, 108B and/or one or more aforementioned objects located inside or that are associated with one or more platforms 122 is/are affixed to one or more and/or any or any combination of generator(s) 112, flywheel(s) 114, bearing(s) 110, bushing(s), sleeve(s), roller(s), one-way bearing, and/or sprag clutch bearing, and/or freewheel clutch bearing, one-way clutch, and/or ratchet system 118, gears 120, gearbox(es) 116, combination of gears, torsion object(s), sprocket, item(s) with teeth, coupling(s), other components/items.

In one embodiment, when a protrusion 104 is depressed downward and/or upward, it directly or indirectly moves/rotates/powers any one or more and/or any or any combination of the following: shaft(s) 108A, 108B, generator(s) 112, flywheel(s) 114, pulley(s), roller(s), sprocket(s), bearing(s) 110, one-way bearing, and/or sprag clutch bearing, and/or freewheel clutch bearing, and/or one-way clutch, and/or ratchet system 118, gears 120, gearbox(es) 116, combination of gears, torsion object(s), sprocket(s), other components/items.

In one embodiment, the brake(s)/stop(s)/member(s)/device(s) is/are affixed/coupled/incorporated into one or more or any or any combination of the protrusion(s) 104, reset member(s) 126, 130 other item(s), that will secure and stop the protrusion(s) 104 and/or reset member 126, 130 in their proper reset position(s) so that the protrusion(s) 104 are again ready to capture/recycle the energy released by the next overhead passing and/or stopped object/tire.

In one embodiment, the aforementioned one or more gear(s)/gearing/teeth incorporated into and/or on/affixed to at least some portion of the protrusion 104 are of the same and/or different sizes, and/or types, for such factors that include but are not limited to, the number of gear teeth, gear pressure angle(s), gear tooth depth(s) thickness, diameter of gears, gear material, gear diametral pitch, gear pitch diameter, gear circular pitch, gear hub diameter, of any other protrusion 104 and/or adjacent gear(s) 120.

In one embodiment, the power generating apparatus 100 further comprises one or more or any or any combination of transmission(s) which are incorporated into, outside, or both inside and outside of the platform(s) 122. The transmission(s) are optimized for one or more or any or any combination of input force such as, but not limited to, starting force, stopping force, slower force, and faster force. In one embodiment, the transmission(s) operate either manually, automatically, or any combination thereof. In one embodiment, one or more or any or any combination of transmission(s) are used to rotate directly, indirectly, or both, one or more or any or any combination of generator(s) 112, shaft(s) 108A, 108B, located inside, outside, or inside and outside of the platforms 122.

In one embodiment, one or more transmissions may be composed of, but not limited to, one or more or any or any combination of gear(s), gearing(s), linear gear(s), gear ratio(s), epicyclic gear(s), planetary gear(s), gear train(s), gearbox(es), belt(s), pulley(s), sprocket(s), chain(s) roller(s), clutch(s), torque converter(s), fluid(s), flywheel(s), generator(s), other item(s). In one embodiment, the power generating apparatus 100 further comprises different types of transmissions including any one or more or any or any combination of the following, but not limited to, manual, automatic, non-synchronous, automated manual, sequential manual, bicycle gearing, dual clutch, continuously variable, infinitely variable, electric variable, electric, hydrostatic, hydrodynamic, hybrid(s), hydraulic, other types of transmissions. In one embodiment, the power generating apparatus 100 maximizes the rotations per minute (RPM) of shafts 108A, 108B which in turn rotate one or more or any or any combination of the generators 112, flywheels 114, gearboxes 116. In another embodiment, the power generating apparatus 100 maximizes the rotations per minute (RPM) of one or more or any or any combination of generator(s) 112, flywheels 114, gearboxes 116 directly or indirectly; in either embodiment, the objective is to produce electricity, by harnessing the force of the passing overhead object, for example, a vehicle's tires without slowing down the moving object by anything more than negligible levels. In one embodiment, the transmission contains transmission fluid.

In one embodiment, each platform 122 is equipped with and/or be affixed to/with, one or more fail-safe(s) for preventing the protrusion(s) 104 from remaining in a protruded/extended position above the top of the protective cover 140 of the platform 122 and/or preventing the protrusion(s) 104, 103 (shown in FIGS. 16A and 16B)) from being depressed fully into the platform 122, when an object, for example, a vehicle's weight distributed through a tire, of minimum predetermined weight/force attempts to depress the protrusion 104, 103 into the platform 122. In one embodiment, the fail-safe(s) ensure the protrusion(s) 104, 103 will be depressed and/or remain depressed below the top of the protective cover 140 of the platform 122 when an object, for example, a vehicle's tire that transfers a minimum predetermined weight and/or force tries/attempts to depress the protrusion(s) 104, 103 into the platform 122 when the power generating apparatus 100 would otherwise not function properly. In one embodiment one or any combination of protrusion 104, 103, gearbox 116, gear 120 will be engineered to fail or break away in order to prevent a protrusion 104, 103 from remaining in an upright position when a predetermined force or greater has been applied to said protrusion 104, 103. So, for example, in one embodiment when a Motorcycle tire rolls over a protrusion 104, 103 then that protrusion 104, 103 must not lock/freeze in place and/or fail to depress into the platform 122, because that could possibly cause a motorcycle rider to lose control and experience serious physical harm/injury. If any object/vehicle tire of a minimum predetermined weight passing overhead were to fail to depress the protrusion 104, 103 into the platform 122 it could cause the object/vehicle tire to slow down because the protrusion 104, 103 becomes a bump/hump, and/or it could possibly cause harm or other unintended consequences. In one embodiment, one or more fail-safe(s) associated with one or more or any or any combination of the protrusion 104, 103 shaft(s) 108A, 108B, gearbox 116, and gears 120 and will effectively prevent this potential problem from occurring.

In one embodiment, the gears 120, gearbox 116 and/or any other moving parts/components of the power generating apparatus 100 are lubricated using a lubrication system. Lubrication is necessary for the gears 120, gearbox 116, and/or other moving parts/components to operate properly and to protect them from becoming damaged. In one embodiment, each platform 122 has one or more entry and/or exit port(s) inside and/or outside the platform(s) 122 through which the lubricant is applied by either filling, pumping, draining, flushing, and/or transferring to protect the gears 120, gearbox 116, and/or other moving parts/components. In one embodiment, the lubrication system uses one or more or any or any combination of, but not limited to, sealed containers(s), conduit(s), channel(s), hose(s), duct(s), vein(s), tube(s) to lubricate component(s)/part(s) of one or more platforms 122. The lubrication is applied/transferred either during the same lubrication instance, or during different lubrication instances, or a combination of both. In one embodiment the maintenance of a lubrication system may or may not require direct physical access to the contents inside the platform(s) 122 in order to lubricate the said contents. In one embodiment, the lubricant of the lubrication system is replaced/recycled/changed without having to open the cover or similar entryway of the platform 122.

In one embodiment one or more or any objects of the present invention, including but not limited to one or more generators 122, inverters 196, batteries/energy storage devices 166, electronics, are cooled using one or more cooling systems. In one embodiment the one or more cooling systems use one or more fluids. In one embodiment the one or more cooling systems use one or more or any or any combination of pumps, hoses, tubes, conduits, fans, storage tanks, coolant, fins, fluids, other items.

In one embodiment, the platform 122 further comprises one or more energy storage devices and/or systems such as, but not limited to, capacitor(s) and/or battery(s), which are used to store the electricity/power produced by the generators 112 in one or more platforms 122. In one embodiment, the capacitor(s)/battery(s)/other energy storage devices can be located inside and/or outside a platform 122 and could be connected to one or more platforms 122. In one embodiment, the electrical power produced by the generators 112 is securely transferred to one or more power grids and/or one or more energy storage devices and/or systems via at least some power conductors/cables. In one embodiment, the power conductors/cables associated with the platform 122 are insulated.

Figure 2:
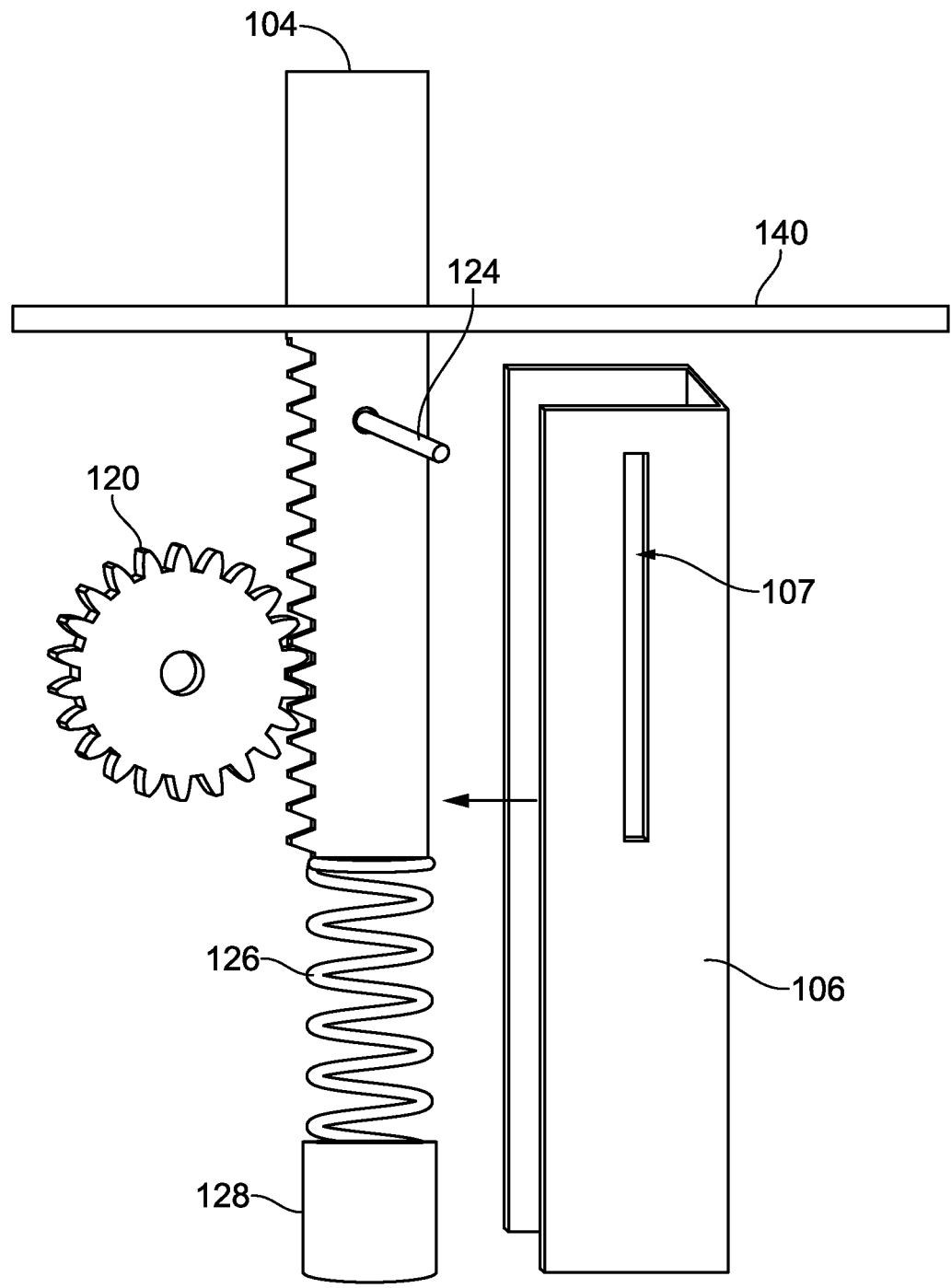
FIG. 2 shows a side view of one version of a protrusion, reset mechanism, and protrusion guide of the electrical power generating apparatus and its interaction with a gear which will rotate a shaft in one embodiment of the present invention.

Referring to FIG. 2, a side view of the protrusion 104 along with the guide 106 in one embodiment is disclosed. In one embodiment, the protrusion 104 is positioned within the guide 106 and said protrusion 104 slides within the guide and said protrusion is associated with at least one reset member 126 and said reset member is secured to a base/holder 128 using at least any one connector/fastener. In one embodiment, when the reset member 126 decompresses and forces the protrusion 104 back to its start position, a brake/stop 124, for example a pin, which is affixed to the protrusion 104, and moves within/inside/through slits/channels 107 of the guide 106 forces the protrusion 104 to stop at a predetermined location. In one embodiment, each guide 106 associated with a protrusion 104 is configured to guide/direct the motion/positioning/re-positioning of the protrusion(s) 104 and the reset member(s) 126 and also hold the protrusion(s) 104 and reset member(s) 126 in proper location(s)/position(s).

In one embodiment, the guides 106 are made of ferrous and/or non-ferrous materials, and/or the combination thereof and they are installed to ensure the powerful forces captured by one or more protrusions is/are directed onto the item(s) it interacts with, to ensure the protrusion stays fully engaged and does not slip/pull/fall away and thus fail to transmit the overhead force into rotational force needed to rotate one or more or any or any combination of shaft, generator, gearbox, flywheel, other items. In one embodiment, each reset member 126, 130 is located at a bottom portion of each protrusion 104 and securely positioned using a holder 128, wherein the reset member 126, 130 is configured to quickly decompress and reposition the protrusion 104 to its original state when the object/vehicle tire passes away from the top 140 of the protrusion 104, 103. In one embodiment, the holder 128 is configured to prevent the reset member 126, 130 from flying away and/or bulging outward when the reset member 126, 130 is compressed by the object, for example, a vehicle tire. In one embodiment, each reset member 126, 130 is connected/fastened to a surface.

In one embodiment, the reset member 126, 130 is at least any one of an elastic member, spring or springs, elasticized cord or cords, pulley and counter weight system, lever and fulcrum. In another embodiment, the reset member 126, 130 is comprised of repelling magnets. In another embodiment, the reset member 126, 130 is a compression device and/or comprised of fluids and/or gases that compress when force is applied, and decompress when the force has passed. In an exemplary embodiment, the reset member 126, 130 is a spring.

In one embodiment, torsion object(s) capture/hold/store energy initially transferred by passing overhead objects/vehicle tires via one or more protrusion 104, 103. The one or more torsion object(s) are directly and/or indirectly charged by the weight/force of a passing object/vehicle tire and/or energy harnessed by one or more protrusions 104, 103. In one embodiment, the one or more torsion object(s) are directly and/or indirectly charged by the same power used to rotate one or more or any or any combination of generator(s) 112, flywheel(s) 114, gearbox(es) 116, sprocket(s), bearing(s) 110. In one embodiment, the one or more torsion object(s) are united/linked/married/affixed/joined to one or more object(s)/item(s) inside or associated with a platform 122. In one embodiment, the energy held by the torsion objects(s) is then released to rotate one or more or any or any combination of generator(s) 112, flywheel(s) 114, and/or shaft(s) 108A, 108B directly or indirectly. In one embodiment the energy released by the torsion objects(s) is released in such a manner that the energy extends the duration of rotation time and/or RPM of the generator(s) 112 and/or flywheel(s) 114 and/or shaft(s) 108A and 108B.

Figure 3:
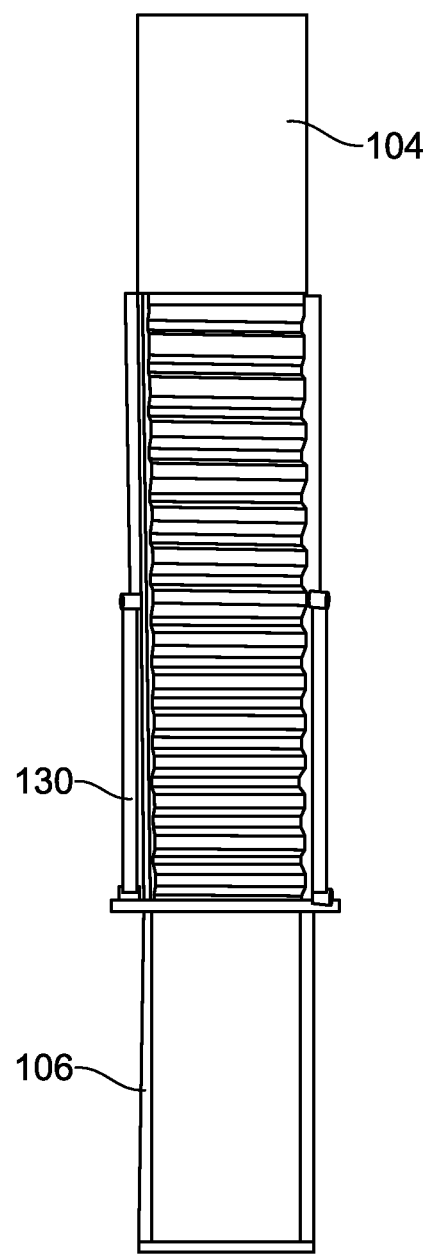
FIG. 3 shows a front view of one version of a protrusion held within a guide (protrusion guide) associated with one of the electrical power generating apparatuses in another embodiment of the present invention.
Figure 4:
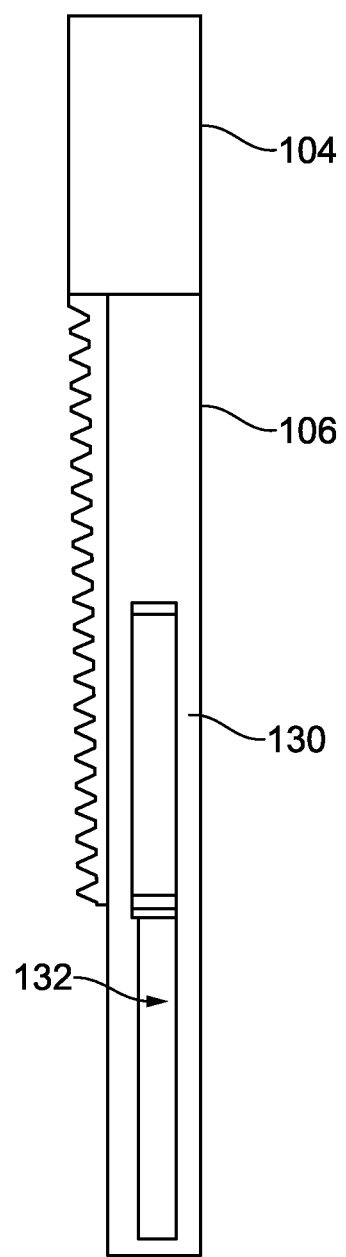
FIG. 4 shows a side view of the protrusion of FIG. 3 held within a guide (protrusion guide) associated with one of the electrical power generating apparatuses in another embodiment of the present invention.

Referring to FIGS. 3-4, the protrusion 104 is contained within a guide 106 in another embodiment of the present invention. In another embodiment, the protrusion 104 is positioned to slide within the guide 106 and decompress/reset after an object/vehicle tires have passed overhead via reset members 130. In one embodiment the protrusion 104 is configured to depress from the weight/force of an object/vehicle tire and move back upward via the reset members 130 so that the top of the protrusion 104 moves back upward through one or more apertures or holes located in/through a top portion of the protective cover 140 of the platform 122 when the object passes away from the protrusion 104. In one embodiment multiple protrusions 104 could be depressed by an object or objects at the same time and/or in succession. In one embodiment, the reset members 130 are securely affixed to both left and right sides of the guide 106 and are configured to move up/down/up through the channel 132 on both sides of the guide 106 and quickly re-position/reset the protrusion 104 to its original state when the object, for example, a vehicle's tire(s), passes away from the protrusion 104. In one embodiment, the reset members 130 are affixed to the guide 106 and some portion of the protrusion 104. In one embodiment each guide 106 is configured to guide/direct the motion/positioning/re-positioning of the protrusion(s) 104 and also position the protrusion(s) 104 and the reset members 130 in proper location(s)/position(s). In one embodiment, the design takes up less vertical space inside the platform 122.

Figure 5:
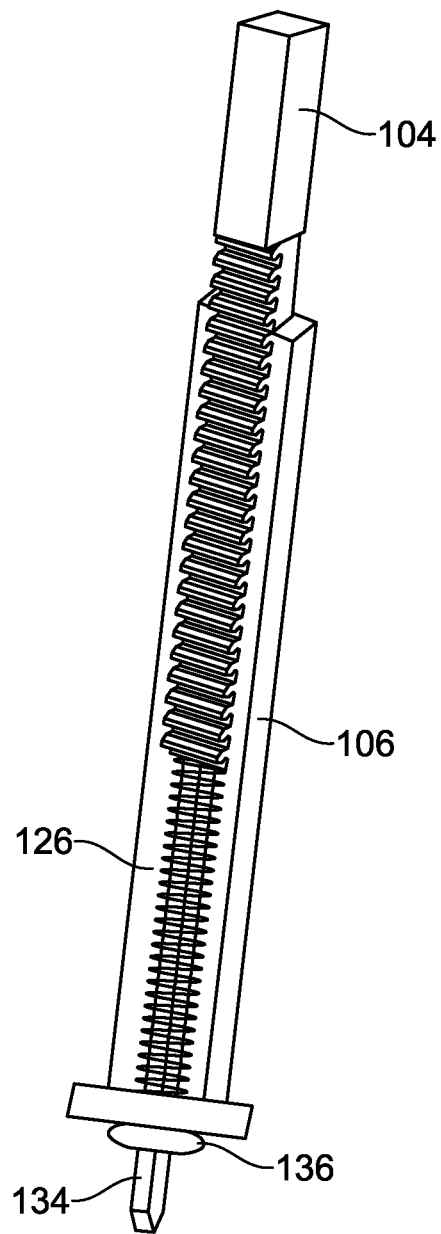
FIG. 5 shows a three quarter's front perspective view of one version of a protrusion as a vertical shaft that can slide up and down within/through a secured protrusion guide and incorporates a reset member and is associated with one of the power generating apparatuses in yet another embodiment of the present invention.

Referring to FIG. 5, the protrusion 104 slides within the secured guide 106 and it is reset to its starting position using the reset member 126. In this embodiment, a vertical shaft 134 runs through the reset member 126, for example, a spring. In one embodiment the vertical shaft 134 prevents the reset member 126 from bending/bulging outward while still allowing the reset member 126 to compress freely. In one embodiment, the bottom of the vertical shaft 134 is secured to a brake/stop 136 such as, but not limited to, a locking pin, stopper or brake, and thereof. In one embodiment the outer diameter of the vertical shaft 134 basically fills the inner diameter of the reset member 126, for example, a spring.

Figure 6:
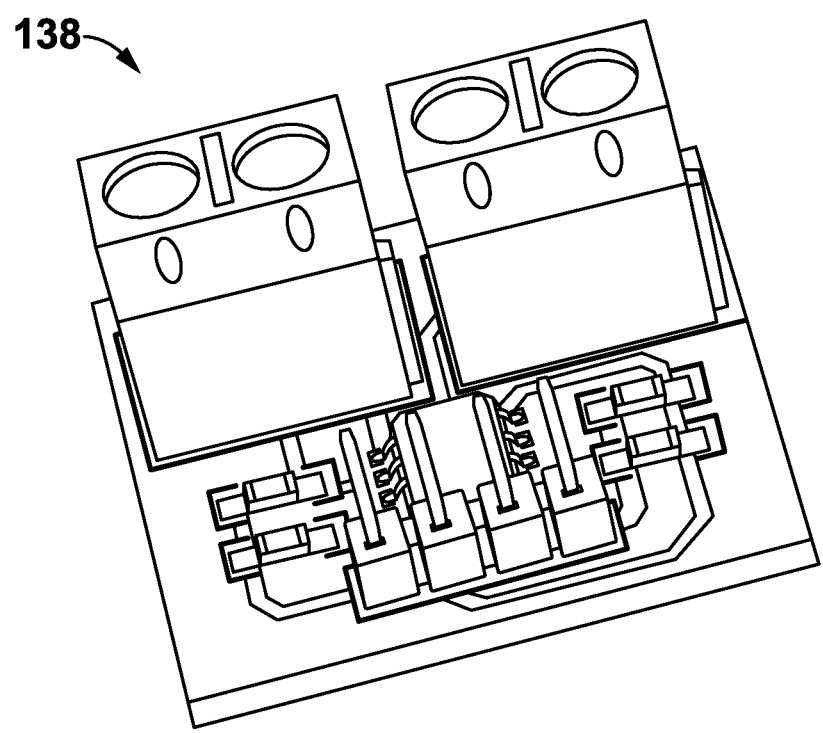
FIG. 6 show a perspective view of a sensor used for detecting/reading/registering current (amps), voltage (volts), other electrical data, other performance input(s)/data from the one or more or any or any combination of generator(s), flywheel(s), other platform components/contents/items in one embodiment of the present invention.

Referring to FIG. 6, a sensor 138 used for detecting/reading/registering current (amps), voltage (volts), other electrical data, other performance input(s)/data from the one or more or any or any combination of generator(s) 112, flywheel(s) 114, platform 122 components/contents is disclosed. In one embodiment, each platform 122 comprises one or more or any or any combination of sensor(s) 138, meter(s), gauge(s) and any combination for detecting/reading/registering current (amps), voltage (volts), other electrical data, other performance input(s)/data from the one or more or any or any combination of generator(s) 112, flywheel(s) 114, platform 122, components/contents. In one embodiment, the data from said one or more or any or any combination of, but not limited to, sensor(s) 138, meter(s), gauge(s) are accessed locally. In another embodiment, the data from said one or more or any or any combination of, but not limited to, sensor(s) 138, meter(s), gauge(s) are reported/accessed remotely. In another embodiment, the data from said one or more or any or any combination of, but not limited to, sensor(s) 138, meter(s), gauge(s)s can be accessed locally and/or remotely, additionally data could be communicated via wireless or wired transmission, or both.

Figure 7:
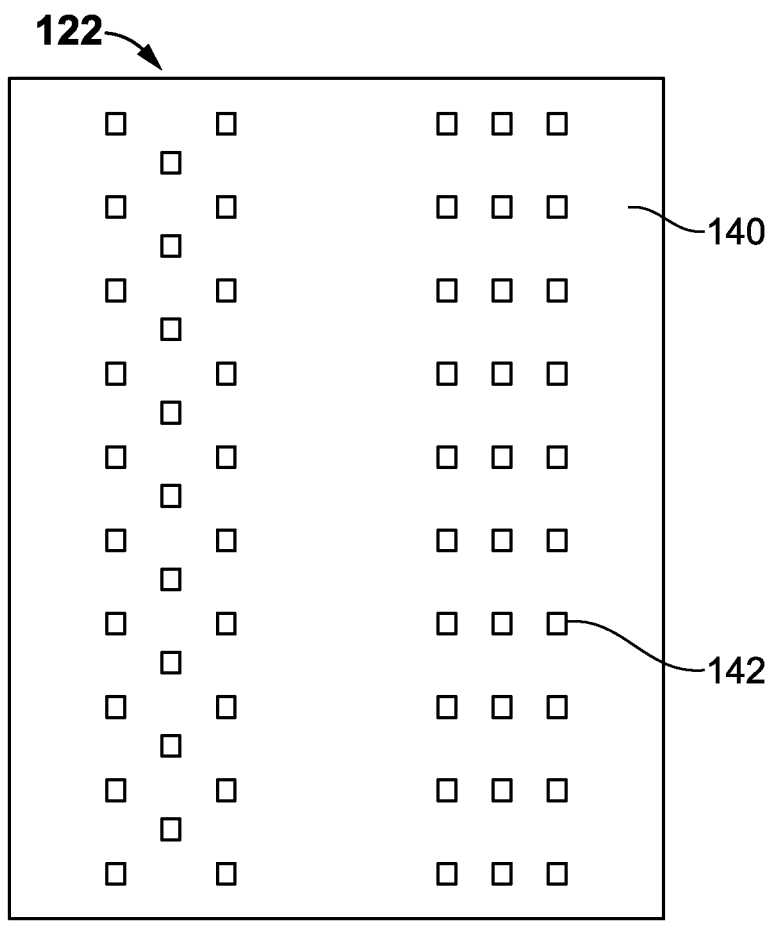
FIG. 7 shows an overhead view of a platform of an electric power generating apparatus with apertures in the top cover of the platform, in one embodiment of the present invention.

Referring to FIG. 7, an overhead view of a top portion of a platform 122 with the protective cover 140 of the platform 122 containing apertures 142 is disclosed. In one embodiment, the platform 122 is to be securely positioned to lay on top of a surface and/or be affixed to and/or inside a surface, wherever moving objects, vehicles or vehicle attachments could travel/traverse/move/stop. In one embodiment, the surface includes any surface, such as but is not limited to, one or more locations where wheeled vehicles traverse, including but not limited to entrance and exit areas of parking areas/lots, drive-throughs, streets, roads, avenues, paths, highways, expressways, freeways, thruways, bridges, tunnels, toll areas, interstates, superhighways, turnpikes, arteries, parkways, on-ramps, off-ramps, tunnels, bridges, and so forth. In another embodiment the surfaces include tracks, sidewalks, walkways, paths, trails, and floor. In one embodiment, the platforms 122 could be physically connected to each other to facilitate the smooth transfer of objects and/or wheeled vehicles along the tops of the platforms. In one embodiment, the platform protective cover 140 is comprised of a non-slip surface or surfaces and/or textures on at least an upper exterior section to assist object(s), for example, vehicles 156 (shown in FIG. 13) for traversing/traveling/moving on the top 140 of the platforms 122. The top of the protective cover 140 of the platform 122 contains a plurality of apertures 142 and the protrusions 104 could move within/through these apertures 142. The protrusions 104, 103 are initially raised up above the top of the platform 122. In one embodiment, the platforms 122 are further comprised of color/colors that reflects wavelengths of sunlight, in order to reflect heat away from the platform 122 and the inside of the platform 122. The use of color and/or color coatings could be an important cooling or heating solution in areas with abundant sunshine. In one embodiment, the color or coatings or materials used for the top 140 of the platforms 122, or other exterior sections of the platform 122, could either absorb, or reflect, wavelengths of sunlight, or both, in order to heat or cool the platform 122. In one embodiment, the platform 122 further comprises ventilation apertures to allow air to flow into and/or outside of the platform 122. In one embodiment, the platform 122 is/are insulated. In one embodiment, the platforms 122 could be of virtually any length, width, shape or size.

In one embodiment, the electrical contents/components of the platforms 122 could be securely and electrically connected to each other using one or more conductors. In one embodiment one or more electrical contents/components are secured to one or more conductors with one or more connectors. In one embodiment, at least some insulated and/or waterproofed electrical conductor or conductors is/are used to connect at least some electrical components/contents, for example, generators 112 of the individual platform 122 with the electrical power grid and/or power storage unit(s), and/or to connect the components/contents of the platform(s) 122 with the electrical power grid, and/or connect the power grid or other power sources to components, for example, electrical conductors 154 (shown in FIG. 12) of the platform 122. In one embodiment, one or more electrical conductor(s) enclosed inside at least some insulated and/or water proof materials/conduits will be used to supply or transport electricity within the present invention, to the power grid or power storage unit(s). In one embodiment, the one or more or any or any combination of structure, conduit, passage, skin, coating, items designed to hold/contain/surround the conductor(s) that transmits electricity/current are designed to provide a barrier between the conductor(s) and people in order to safeguard/protect people from harm and/or protect the conductor(s).

In one embodiment, the electric current generated by one platform 122 which houses the generators 112 is combined via at least some electrical conductor(s) that may or may not be insulated and/or water proof, with the electric current generated by one or more additional platforms 122 housing generators 112 to transfer the generated electrical current to a power grid, other electric storage devices, other location. In one embodiment, when electric current generated by one platform 122 exits the platform 122 and adequate conductor(s) are used to transport the electric current to the power grid or power storage unit(s), at least one diode is installed to resist/prevent the current from flowing back toward the generator 112 of platform 122. In one embodiment, the entire platform 122 has a height above the surface onto which it is positioned of about, but not limited to, approximately 8 inches or less. In one embodiment, the structure of these platforms 122 is of a low/compact height. In one embodiment, the low/compact height structure is designed to reduce the length/distance of the on/off ramps that connect the top of platforms 122 with the road surface and upon which vehicles could move without scraping the underside of the said vehicles, and/or to strengthen the platform structure, and/or to allow for the use of less material for the manufacture/production of said platform structures, etc.

In one embodiment, the plurality of full or partial apertures or conduits 142 is provided on/through the top portion/cover 140 of each platform 122. In one embodiment, each aperture/conduit 142 of each platform 122 prevents rain and/or snow from entering into the platform 122 and damaging the components inside the platform 122. In one embodiment, at least one platform 122 is electrically grounded and/or uses at least one ground fault circuit interrupter(s) to protect the electric power generating apparatus and/or living creatures from harm while operating safely. In one embodiment, all the platforms 122 that are networked together for a particular installation are all associated with the same one or more electrical grounding. In one embodiment, the platforms 122 and/or at least some parts/items of the platforms 122 are made of, but not limited to, rustproof materials, and/or are coated/sealed/protected with paint(s)/chemical(s)/material(s) to shield/protect the platform 122 and/or said parts/materials from one or more or any or any combination of rusting, corrosion, environmental wear and tear. In a preferred embodiment, the protrusions 104, 103 could fit closely/snugly inside/within the area of the apertures 142 and fill the area of the apertures 142 so that very little moisture, or any moisture, or other environmental elements can seep inside the platform 122 through the apertures 142. In one embodiment, one or more apertures 142 enter and exit the top of the protective cover 140 of the platform 122, while other one or more apertures 142 are partial apertures.

Figure 8:
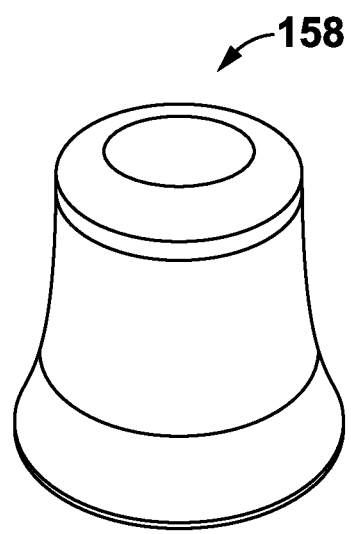
FIG. 8 shows a water proof cap/enclosure/item used for enclosing a protrusion that extends through and aperture above the platform cover in one embodiment of the present invention.

Referring to FIG. 8, a water proof cap/enclosure/item 158 used for enclosing the protrusion 104, 103 that extends above the platform cover 140 is disclosed. In one embodiment, the section of the protrusion 104, 103 that extends above the platform 122 cover is enclosed inside/within one or more water proof cap/enclosure/item 158 or pliable layer and the protrusion 104, 103 moves inside said one or more cap/enclosure/pliable layer/item 158, and said cap/enclosure/pliable layer/item 158 is used to prevent water/moisture from seeping into the platform 122 via the aperture 142 through which the protrusion 104, 103 moves. In one embodiment, the one or more cap/enclosure/pliable layer/item 158 are positioned in the opposite direction, for example they are flipped upside down compared to the exterior more cap/enclosure/pliable layer/item 158 and is/are instead located inside the platform 122 and could be affixed to the platform cover 140 using at least one more rubber/pliable cap/enclosure/layer/item and said upside down one or more cap/enclosure/pliable layer/item 158 is/are used to prevent water/moisture from seeping into the platform 122 via the aperture 142 through which the protrusion 104, 103 moves. In one embodiment, the aforementioned caps/enclosures/pliable layers/items 158 are flexible and/or ribbed and do not impede the motion/movement of the protrusion 104, 103. In another embodiment, the aforementioned caps/enclosures/items 158 could impede the motion/movement of the protrusion 104, 103 to some degree, but the benefits of the solution outweigh the impediment(s). In one embodiment, the protrusion 104, 103 fits closely/snugly inside/within the area of the apertures 142 and fills the area of the aperture 142, and the lubricant is used to lubricate the movement between the protrusion 104, 103 and aperture 142 and said lubricant could also work to keep moisture out of the platform 122. In one embodiment, the protrusion 104, 103 that extends above the top cover of the platform 122, and the item or items interacts with inside the platform 122 are physically separated by one or more water proof barrier/enclosure/item to prevent water from outside the platform 122 from seeping into the platform 122; however said item or items interacts with one or more items inside the platform 122 and operate in conjunction with each other. In one embodiment, if the cap/enclosure/pliable layer/item 158 is inside the platform 122 then it is likely the protrusion and the lever 105 it interacts with are separated, because in that embodiment the rubber/pliable item will be between them and yet they still work together even though they do not need to be physically attached to each other. The one or more barrier/item/layer could be fastened/connected in place and/or held in place with one or more or any connector/fastener including but not limited to adhesives.

Figure 9A:
FIG. 9A shows a side view of the platform of the electric power generating apparatus which includes sloped/inclined/declined/ramp surfaces around the exterior front and back portions of the platform in one embodiment of the present invention.
Figure 9B:
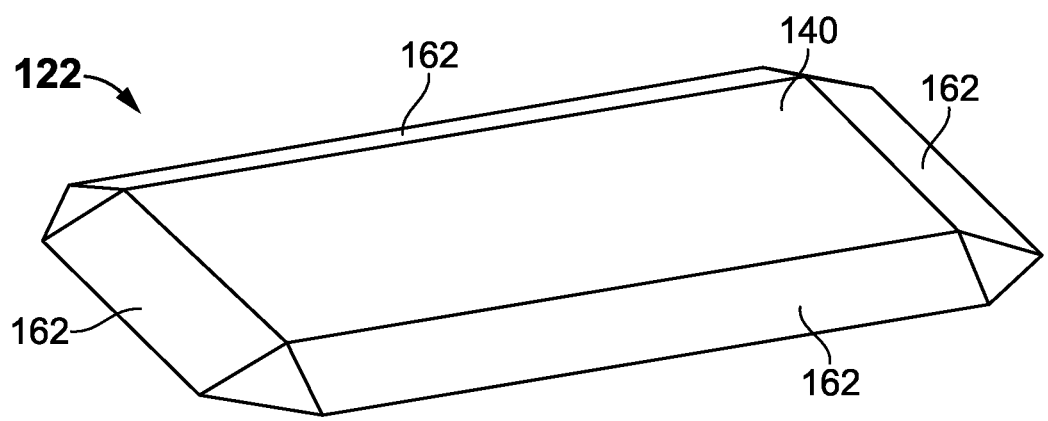
FIG. 9B shows a perspective view of the platform of the electric power generating apparatus which includes sloped/inclined/declined/ramp surfaces around the outside portions in one embodiment of the present invention.

Referring to FIGS. 9A-9B, the platform 122 includes sloped/inclined/declined/ramp surfaces 162 around the exterior outside/side portions is disclosed. In one embodiment, the sloped/inclined/declined/ramp surfaces 162 could be located around any exterior outside/side portions enabling smooth traveling of the vehicles 156 (shown in FIG. 14) on and off the platforms 122. In one embodiment, the inclined/sloped/declined/ramp surfaces 162 bridge the top portion of the platform cover 140 of the platforms 122 with the surface on which they are placed. In another embodiment, if the platforms 122 are positioned in very close proximity to other platforms 122, then those sides of the platforms 122 do not require sloped/inclined/declined/ramp surfaces 162 around the exterior side portions and in one embodiment neither requires additional connector surfaces. In some embodiments, the top of at least more than one platform 122 are connected by connectors to facilitate the smooth transition of objects from the top of one platform 122 to the next. In some embodiments, the platforms 122 do not have any sloped/inclined/declined surfaces 162 around the exterior outside portions. In some embodiments, only a specific exterior outside/side portion, or portions of the platforms 122 have inclined/sloping/declined/ramp surfaces 162. In one embodiment, the sloped/inclined/declined/ramp structure 162 are affixed to one or more platforms 122. In one embodiment, the sloped/included/declined/ramp structure 162 and the one or more platforms 122 are one component/fixture. In one embodiment, the platforms 122 include one or more cavities/open areas. The cavity or cavities is/are configured to receive one or more or any or any combination of protrusion 104, 103 lever 105 (shown in FIG. 16A), gearbox 116, generators 112, flywheels 114 shafts (108A and 108B), gears 120, bearings 110, pulley(s), roller(s), sprocket(s), one-way bearing, sprag clutch bearing, freewheel clutch bearing, one-way clutch, ratchet system 118, and so forth. In one embodiment, the platforms 122 are made of durable materials to safely support the weight of passing or stopped objects or vehicles 156 without breaking. The platforms 122 should be capable of even supporting the weight of rush hour and or bumper to bumper traffic that is stopped or passing over the platforms 122, without breaking. In one embodiment, the platforms 122 resist buckling that would otherwise be caused by the weight of passing or stopped objects or vehicles. In one embodiment, the uppermost surface 140 of the platforms 122 resist buckling that would otherwise be caused by the weight of passing or stopped objects or vehicles. In one embodiment, the platforms 122 can be locked with one or more locking devices to prevent unauthorized entry into the inside of the platforms 122. In one embodiment platforms 122 can be locked in position with one or more locking devices to prevent the theft of the platforms 122.

In one embodiment, each generator 112 associated with the platform 122 is positioned and secured in a fixed location associated with the platform 122. In one embodiment, the platform structures and/or transition shaped structures 164 are designed to accommodate curves and/or turns in roadways in order to keep vehicles 156 on the platforms 122. In one embodiment, these structures 164 used to accommodate turns/curves in roads are wedge shaped structures, wherein one end of the wedge shaped structure is narrower or wider than the opposite end of the wedge shaped structure.

Figure 10:
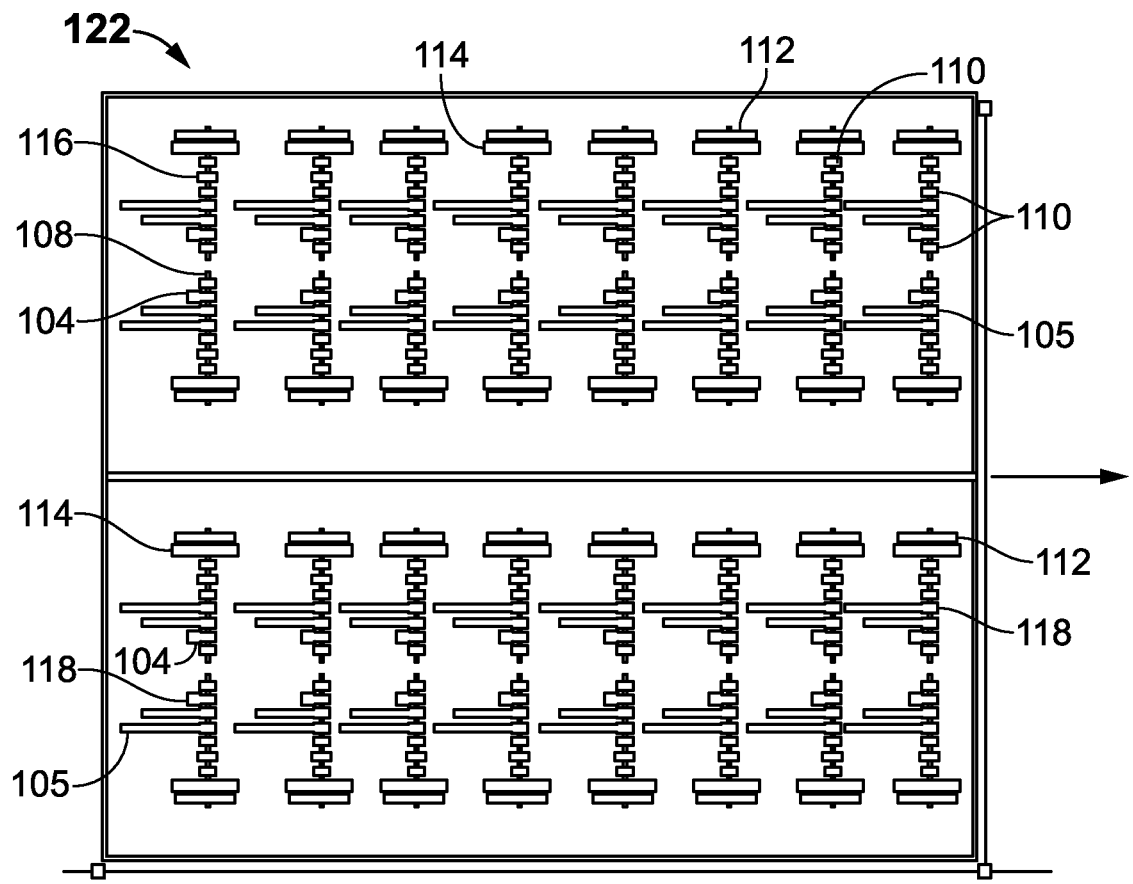
FIG. 10 shows an inside overhead cutaway view of the inside of a platform with its cavities/open areas and with one or more generators, flywheels, gearboxes, rotating shafts and push force to rotation force systems, other items, in one embodiment of the present invention.

Referring to FIG. 10, the plurality of generators 112 are securely positioned inside the cavity or cavities of the platform 122. In one embodiment, the generators 112 are electrically connected to each other. In another embodiment, the generators 112 are not connected to each other. In one embodiment, the generators 112 are securely connected to the shafts (108A and 108B) (shown in FIG. 1) that rotate one or more generators 112. In another embodiment, individual generators 112 are rotated with or without rotation of the shafts (108A and 108B). In one embodiment, one or more fan blades are affixed to a shaft or shafts (108A and 108B) and/or other moving components inside the platform 122 to circulate air inside the platform 112. The generators 112 are configured to generate electrical power by converting the rotational motion of the shafts (108A and 108B) and/or by being rotated directly. In one embodiment, the generators 112 are arranged in any configuration, such as but not limited to a, row or column configuration in the platform 122 to maximize the holding capacity of the platform 122. In one embodiment, the platforms 122 comprise one level of generators 112, which are securely positioned inside the platforms 122. In another embodiment, the platforms 122 comprise multiple-levels/layers of generators 112, which are securely positioned inside the platforms 122. In one embodiment, the generators 112 are fastened/connected/joined or adhered to a portion of a platform or platforms 122 to keep them stable inside the platforms 122. In a preferred embodiment, the generators 112 are raised up off the floor inside the platform 122. In one embodiment, the generators 112 are placed on the floor of the platform 122. In one embodiment, the cavity or cavities of the platform 122 are separated by inner pillars or walls and/or other object(s)/structure(s). In one embodiment, the interior side of the platform's exterior walls is covered with water proof material(s) to keep moisture out of the inside of the platforms 122. In one embodiment, the exterior side of the platform's exterior walls is covered with water proof material(s) to keep moisture out of the inside of the platform(s) 122. In one embodiment, a combination of both the interior and exterior side(s) of the platform's exterior walls is covered with water proof material(s) to keep moisture out of the inside of the platform(s) 122. In one embodiment, specific areas inside the platform 122 are covered with water proof material(s) to keep moisture away from contents. In a preferred embodiment, the conductors that transfer the current from inside the platform 122 to outside the platform 122, will exit the platform 122 in one limited area or areas in order to limit entry points for exterior water/moisture and/or other environmental elements into the platform 122. In one embodiment, additional covers and/or barriers are installed inside and/or outside the platform(s) 122 to keep moisture and other environmental threats off and/or away from components inside the platform(s) 122.

In one embodiment, the platforms 122 or only specific sections/areas of platforms 122 are designed to be water proof so that water does not enter the water proofed areas, compartments, connections in and/or out of the platforms 122. In one embodiment, the water proofing materials/items used to keep water outside of areas, compartments, connections that are water proofed may contain/incorporate anyone one or more or any or any combination of the following: gaskets, seals, packings, wax, sealants, caulks, materials that incorporate any one or more or any of: petroleum, silicon, rubber, latex, synthetic rubber, acrylic, resin, thermoplastic, elastomer, polymer, soft metals that solidify in place, etc. In one embodiment the aforementioned items fit inside a gland or groove. In one embodiment, some area(s)/sections/components of the platforms 122 will be water proofed and some areas/sections/components will not be water proofed.

In a preferred embodiment, the generators 112 are configured to generate alternating current (AC). In another embodiment, the generators 112 of the power generating apparatus 100 is/are instead configured to generate direct current (DC). Further, the DC current generated by the one or more power generating apparatus 100 could be converted into AC current using one or more power inverters before transferring or feeding the electric current to an electric power distributing network, for example, the power grid. In another embodiment, the power generating apparatus 100 is further configured to generate AC current at one or more particular frequency or frequencies and magnitude from the generators 112. In one embodiment, the generated AC current at some initial frequency and/or frequencies and/or magnitude or magnitude(s) is converted to AC current with another frequency/frequencies and/or another magnitude(s) using a converter or converters, or to DC current.

In one embodiment, the generators 112 are configured to produce Alternating current (AC). Further, the AC current is then converted to Direct Current (DC) via at least one 3 phase bridge rectifier and/or other item(s) and said Direct Current is transferred via at least some one or more conductors to and/or through one or more energy storage devices/batteries before being inverted to AC power and being transferred to one or more an electric power grid(s).

In one embodiment, the power generated by one or more platforms 122 and/or one or more generators 112 associated with the platforms 122 is transferred via at least some conductor(s) to and/or through one or more energy storage devices/batteries before being transferred to one or more an electric power grid(s) via at least some conductor(s). In one embodiment, the power generated by one or more platforms 122 and or one or more generators 112 associated with the platforms 122 is transferred directly via at least some conductor(s) 154 (shown in FIGS. 12, 27) to one or more power grid(s). In one embodiment, the power generated by one or more platforms 122 and or one or more generators 112 associated with the platforms 122 is first inverted via an inverter 196 from DC to AC power and then is transferred directly to one or more power grid(s) via at least some conductor(s) 154. In one embodiment, at least some power generated by one or more platforms 122 and or one or more generators 112 associated with the platforms 122 is transferred directly to one or more power grids via at least some conductor(s) 154 with or without first being inverted from DC to AC power and/or some power is transferred to and/or though one or more energy storage devices/batteries 166 (shown in FIG. 23). In one embodiment, the energy storage devices/batteries 166 work with one or more charge controllers. In one embodiment, charge controller(s) are configured to perform multiple functions include one or more or any or any combination of the following: control the flow of current in and/or out of the energy storage devices/batteries 166, limit the level the energy storage devices/batteries 166 may drain, limit the level the energy storage devices/batteries 166 may charge, prevent overcharging, regulate voltage going into the energy storage devices/batteries 166, serve to protect the energy storage devices/batteries 166 from damage, make all cells in the energy storage device/batteries 166 of equal charge, disconnect at pre-determined low voltage levels, and so forth. In one embodiment, the energy storage devices/batteries 166 are temperature controlled. In one embodiment, the temperature control is provided with and/or within one or more housing/structure/container/shelter that contains the energy storage devices/batteries 166. In one embodiment, the temperature control serves to extend and/or maintain and/or improve the life and/or performance of the energy storage devices/batteries 166. In one embodiment, the energy storage devices/batteries 166 are associated with one or more energy storage device/battery monitors for monitoring the energy storage device/batteries 166, and providing data related to condition and/or performance of the energy storage devices/batteries 166, such as, but not limited to, the power are they holding, the power are they charging, the power are they discharging, how many amp hours have gone in and out of the energy storage devices/batteries, what is the state of charge of the energy storage devices/batteries, and other information. The energy storage devices/batteries monitor may also be associated with a computer interface and/or have other features.

In one embodiment, a diode 168 (shown in FIG. 23) is associated with each energy storage device/battery 166. In one embodiment, the diode 168, is associated with more than one energy storage device/battery 166. In one embodiment one diode 168 is sufficient for an entirety of the energy storage devices/batteries 166. In one embodiment, more than one diode 168 is sufficient for an entirety of the energy storage devices/batteries 166. In one embodiment one or more diodes 168 are used elsewhere in the present invention.

In one embodiment, one or more or any or any combination of switches, disconnectors, fuses, circuit breakers, plugs, inverter, connectors, transformers, are associated with one or more or any or any combination of platforms, conductors, generators, other items of the present invention. In one embodiment, one or more or any or any combination of switches, disconnectors, fuses, circuit breakers, plugs, connectors, are located before or directly associated with an inverter 196 (shown in FIG. 31) that inverts power from DC to AC before conveying the AC power to one or more power grids, or any inverter in the present invention. In one embodiment one or more or any or any combination of switches, disconnector, fuses, circuit breakers, plugs, connectors, are located before and/or associated with one or more energy storage devices/batteries 166. In one embodiment one or more or any or any combination of switches, disconnector, fuses, circuit breakers, plugs, connectors, are associated with one or more conductors and/or one or more locations associated with said one or more conductors that transfer power/current within or through the present invention. In one embodiment there are one or more inverters and/or transformers associated with one or more platforms or networks of platforms of the present invention. In one embodiment a meter is located at the point where power enters the power grid or at any other location associated with the present invention.

Figure 11:
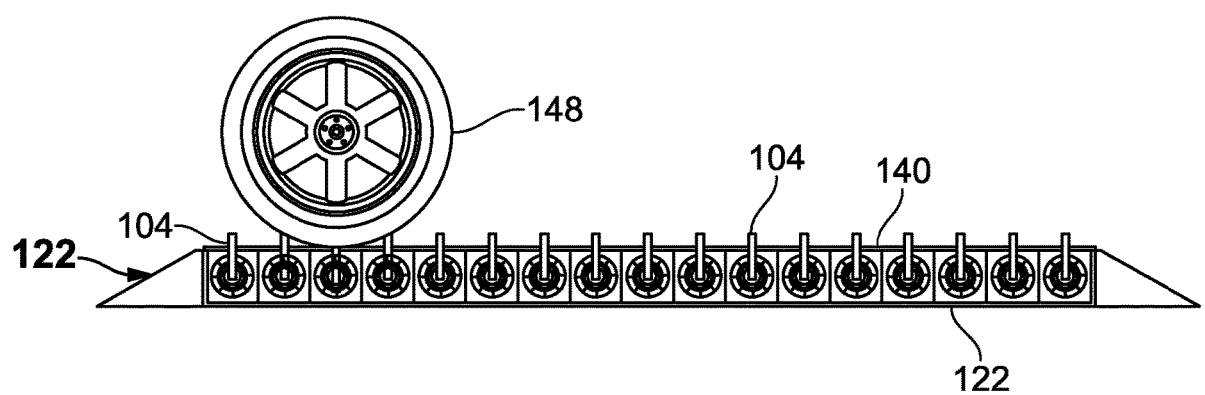
FIG. 11 shows a side cutaway view of a vehicle's tire as it passes or rolls over and/or onto a plurality of protrusions and depresses/moves them through apertures into the platform of the electric power generating apparatus in one embodiment of the present invention.

Referring to FIG. 11, a side cutaway view of a vehicle's tire 148 as it passes or rolls over and/or onto the plurality of protrusions 104, 103 and depresses/moves them through apertures 142 into the platform 122 holding the electric power generating apparatuses 100 in one embodiment is disclosed. In one embodiment, the protrusions 104 are initially extended up above the top portion of the platform cover 140, and then depressed/moved into the platform 122 via/through the plurality of apertures 142 when the vehicle's tires 148 rolls/passes over or stops over the protrusions 104 of the platform 122. The downward pressing energy of the object's and/or vehicle's tire(s) 148 activates the push force to rotation force conversion by transferring that force to rotate the shafts (108A and 108B), generators 112, gearbox 116, within the platform 122. In one embodiment, the plurality of protrusions 104 is further configured to return to its/their normal or initial position after the vehicle's tire 148 passes over the said protrusions 104. The reset members (126 and 130) are configured to force the protrusions 104, 103 to return their initial or normal position. When another tire of any vehicle rolls overhead, the protrusion(s) 104, 103 are depressed/moved again into the platform 122, and if the generator(s) 112 are already rotating, then the passing tire 148 will accelerate the rotation of the shafts (108A and 108B) and the generator(s) 112. Neither/not the movement of the protrusions 104 or the rotation of the shafts (108A and 108B) will hinder the rotation of the components of the generator 112 when the primary protrusion retracts to its starting/reset position. In one embodiment, the push force, rotation force, or combined push force to rotation force mechanism(s) disengage after they have rotated/accelerated at least one shaft (108A and 108B) and associated items and/or the generator 112 and associated items, so as not to impede/hinder rotation of said shaft (108A and 108B) and associated items, generator 112, etc. The protrusions 104 protruding above the platform top cover/plane 140 are of a height and width that will not impede a smooth ride of vehicles traveling over the platforms 122, and will not slow down the velocity of the vehicles 156 at all or by anything more than negligible levels. In one embodiment, the protrusions 104, 103 protruding above the platform top cover/plane 140 are of the same height/length/size. In one embodiment, the protrusions 104, 103 protruding above the platform top cover/plane 140 are of different heights/lengths/sizes. In one embodiment, the protrusions 104, 103 protruding above the platform covers 140 are designed so as not to be ensnared and damaged by passing overhead objects/vehicle tire treads/vehicle tires 148 or by getting caught in a passing vehicle's tire treads. In one embodiment the protrusion 104, 103 is designed to be absorbed by the rubber of the vehicle tire that strikes the protrusion 104 so that the tire does not climb upward on top of the protrusion 104, 103 but instead the protrusion 104, 103 causes an indentation in the tire as the tire rolls over the protrusion 104, 103 and depresses the protrusion 104, 103. Although these platforms 122 are optimized for vehicle traffic, the fact is that the weight of passing pedestrian foot traffic could also rotate the generators 112. In one embodiment, the protrusions 104, 103 could prove to be a tripping hazard when the platforms 122 are positioned on foot traffic path/sidewalks, or other walking/running areas. Thus, in this embodiment or similar embodiments the protrusions 104, 103 should be covered with a layer/cover/ramp, so that passing foot traffic still depresses/moves the protrusions 104, 103 for rotating the shafts (108A and 108B) and generating electric power using the generators 112 of the power generating apparatus 100 without being a tripping hazard. In one embodiment, the protrusions 104, 103 are covered so that when people walk/run on the protrusions, their path is made smooth and/or even and thus prevents tripping/stumbling. In one embodiment, the one or more protrusions 104, 103 or items/components attached/affixed to said protrusions, are designed to be wider at the point/location where the protrusion 104, 103 interacts with the object/vehicle tire than the width of the remainder of the protrusion 104, 103 and/or width of the lever 105 or other items associated with the protrusion 104, 103.

Figure 12:
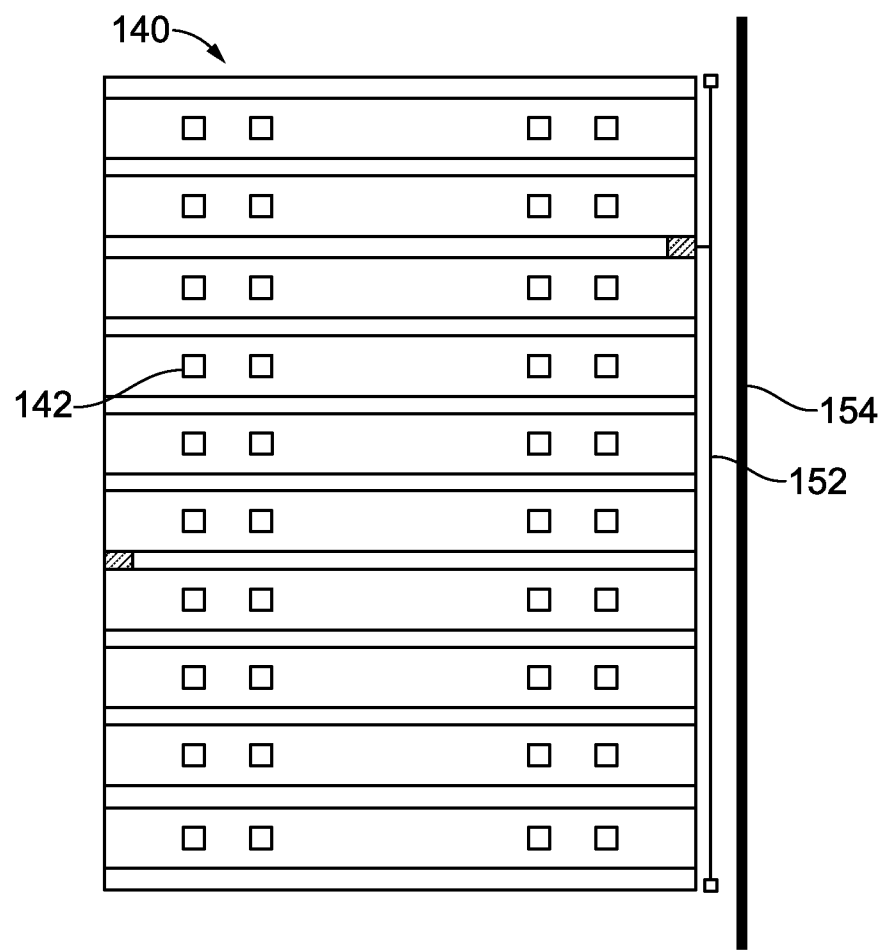
FIG. 12 shows the underside view of a protective cover of the platform including apertures in/through the protective cover, resistive conductors to melt ice/snow that would otherwise accumulate on the platforms, and electrical conductors in one embodiment of the present invention.

Referring to FIG. 12, an underside of the protective cover 140 of the platform 122 is disclosed. In one embodiment, the protective cover 140 is configured to protect the components inside the platform 122, which include, but not limited to, one or more or any protrusions 104, gearbox 116, generators 112, flywheels 114, shafts (108A and 108B), gears 120, bearings 110, pulley(s), roller(s), sprocket(s), one-way bearing, sprag clutch bearing, freewheel clutch bearing, one-way clutch, ratchet system 118, and other components. In one embodiment, the protective cover 140 is comprised of a non-slip surface and/or texture. In one embodiment, the protective cover 140 is positioned on the platform 122 and sealed to keep moisture outside of the platform 122. In one embodiment the protective cover 140 could be opened and/or closed for easy access to the platform contents. In another embodiment, the protective cover 140 is not opened and/or closed for easy access to the platform 122 and the contents. In one embodiment the protective cover 140 is removable. In one embodiment, more than one cover/lid/top 140 is/are associated with one or more platform structures and said cover/lid/top could be opened and/or removed to allow easy access to the contents inside the platforms 122 for repairs/service/maintenance/other, via overhead access/entryway. In one embodiment, the one or more cover/lid/top located on the platform 122 is sealed to keep liquid/moisture/rain/water/flood water out of the platform 122 and in one embodiment 1 or more gaskets are used to keep water out of one or more areas inside a platform. In one embodiment the one or more cover/lid/top 140 is/are associated with one or more hinges of any design/type and the location(s) of the said hinge(s) can be, but is/are not limited to, inside the platform and underside of the platform cover.

In one embodiment, the underside of the protective cover 140 of a platform 122 is provided with one or more resistive conductors 152 for melting ice and/or snow to prevent ice and/or snow from accumulating on the platform 122. In one embodiment, the resistive conductors 152 are affixed or integrated into or near to, but not limited to, a top portion of the protective cover 140. In some embodiments, the resistive conductors 152 are affixed or integrated to or near to, but not limited to, an underside of the protective cover 140. In one embodiment, the resistive conductors 152 heat up on the flow of electric current to melt the snow and/or ice that would otherwise accumulate on the top of the platform 140. In an exemplary embodiment, the resistive conductors 152 could be connected to, but are not limited to, electric conductor(s), insulated/insulated-water proof electric conductor(s) 155 (shown in FIG. 27) in order to provide electric current to the resistive conductors 152 of and/or near to the protective cover 140. In another embodiment, the resistive conductors 152 are affixed to the top portion of the protective cover 140 and/or embedded inside the top protective cover 140 and/or near the top protective cover 140. In one embodiment, one or more conductors 155 are used to transfer/transport current from outside the platforms 122 to the resistive conductors 152 and/or heating item(s)/devices 153 associated with one or more platforms. In one embodiment, one or more conductors 155 are used to transfer/transport current from one or more outside power sources to power the resistive conductors 152 and/or heating item(s)/device(s) 153 (shown in FIG. 27) associated with the platforms 122 used to prevent and/or melt slow and ice build up on one or more platforms 122 or groups of platforms. In one embodiment, one or more conductors are used to transfer/transport current generated from the platforms 122 to power the resistive conductors 152 and/or heating item(s)/device(s) 153 associated with the platforms 122 that are used to prevent and/or melt slow and ice build up on the platforms 122. In one embodiment, the power sources used to supply power to the resistive conductors 152 and/or heating item(s)/device(s) 153 associated with the platforms 122 used to prevent and/or melt slow and ice build up on the platforms 122 is/are provided by a combination of one or more outside power sources and power generated by the platform 122. In one embodiment the heat generated by the generators 112 or other items in/of the present invention is/are used either directly, indirectly, or both, to prevent ice and/or snow build up on one or more platforms and/or other structures, and/or melt ice and/or snow off one or more platforms and/or other structures. In one embodiment, a temperature detection/reading/sensing item/device is associated with the resistive conductors 152 and/or heating item(s)/device(s) 153 of one or more platforms 122 and the data from/of said temperature detection/reading/sensing item/devices is the trigger for activating and/or deactivating and/or adjusting the settings of resistive conductors 152 and/or heating items(s)/device(s) 153 that produce heat. In one embodiment, the resistive conductors 152 and/or heating item(s)/device(s) 153 is/are automatically turned on and off when pre-determined temperature settings/levels are reached in order to melt or prevent the buildup of ice/snow. In one embodiment, the resistive conductors 152 and/or heating item(s)/device(s) 153 is/are manually turned on and off in order to melt or prevent the buildup of ice/snow. In one embodiment a Temperature control unit is associated with at least one platform 122 and is used to control the temperature for one or more locations/areas associated with one or more platform 122. In one embodiment the Temperature control unit is operatively connected to one or more or any or any combination of power source, sensor, relay.

In one embodiment, the temperature for the platform 122 and/or tops of platforms 122 and/or exterior areas of platforms 122 could be adjusted and or set and or changed remotely. In one embodiment, the resistive conductors 152 and/or heating items(s)/device(s) 153 of one or more platforms 122 could be turned on while resistive conductors 152 and/or heating item(s)/device(s) 153 on other one or more platforms 122 are turned off and/or not in use or set to different temperature settings. In one embodiment, a controller for a temperature control switch could be used to turn the resistive conductors 152 and/or heating items(s)/device(s) 153 associated with one or more platforms 122 on/off and/or to maintain the platforms 122 at specific temperatures or temperature ranges. Anyone or more of the following temperature detection/reading/sensing item/device can be used in the present invention, including, but not limited to, one or more or any or any combination of a thermistor, thermometer, liquid expansion thermometer, thermocouples, resistance temperature detector, pyrometer, infrared pyrometers, langmuir probe, infrared sensor, sensor, resistance temperature detectors, bimetallic device, change-of-state sensor, silicon diode, other item/component. In one embodiment, the one or more heating items/devices 153 involve the use and movement of fluid(s).

Figure 13:
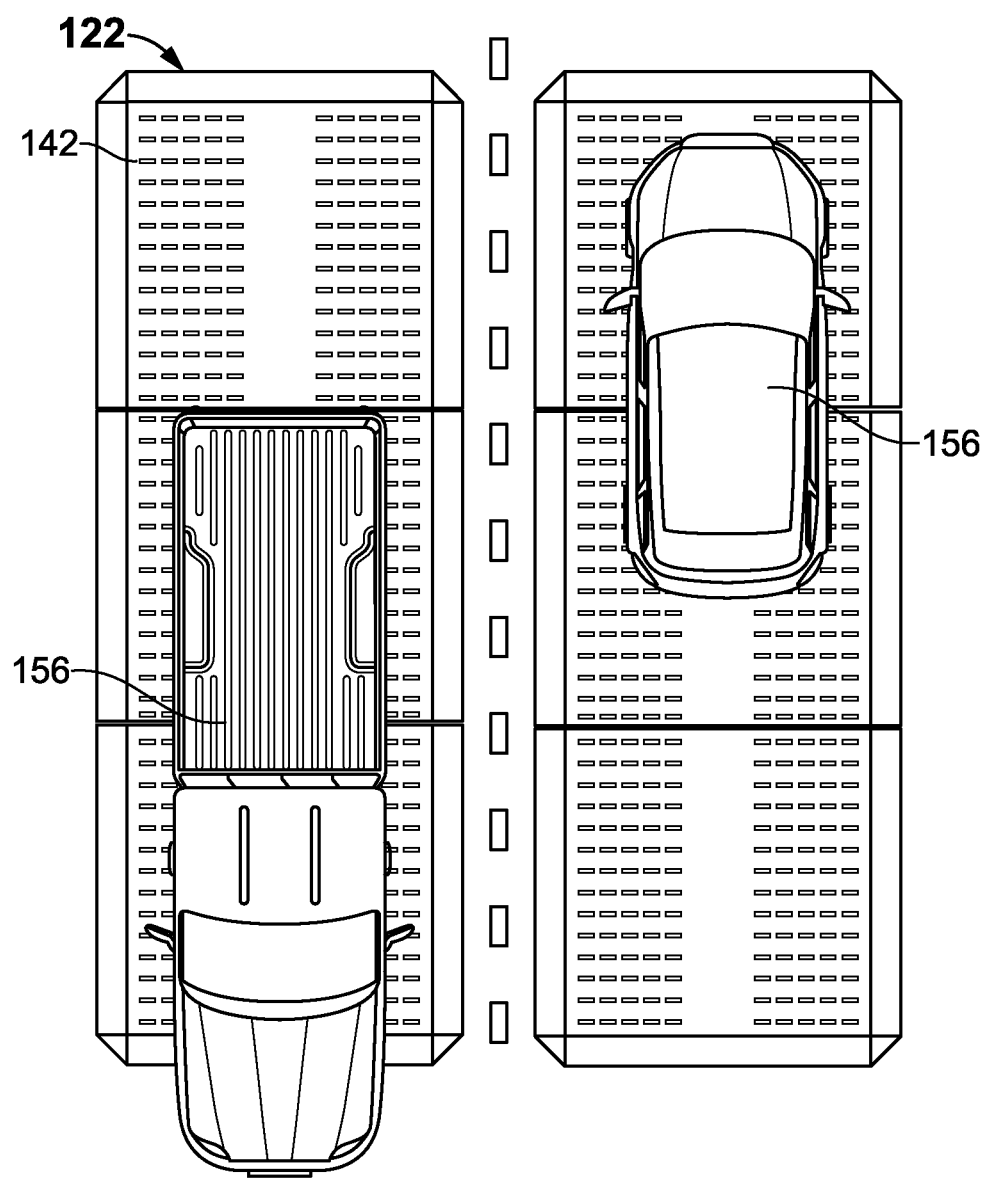
FIG. 13 shows an overhead top view of the platforms with protrusions, and the platforms positioned on a surface, for example, a roadway, with vehicles driving over the top surface of the platforms, in one embodiment of the present invention.

Referring to FIG. 13, the platforms 122 containing the power generating apparatuses 100 are positioned across any surface, for example, but not limited to, highways and roadways are disclosed. In an exemplary embodiment, the platforms 122 could cover the entire width of a lane and/or a lesser width/distance/area of a roadway. In one embodiment, the platforms 122 keep the roadway free from ice and snow in cold weather when that precipitation occurs. The resistive conductors 152 (shown in FIG. 12) and/or the heating items/elements/objects 153 (shown in FIG. 27) are configured to melt the ice and/or snow on the platform 122. In another embodiment, the one or more or any or any combination of protrusions 104, 103, gearbox 116, generators 112, flywheels 114, shafts (108A and 108B), gears 120, bearings 110, pulley(s), roller(s), sprocket(s), one-way bearing 118, sprag clutch bearing, freewheel clutch bearing, one-way clutch, ratchet system, other components of the power generating apparatus 100 are positioned at pre-determined desired or selected areas within the platforms 122. The position of one or more or any or any combination of protrusions 104, 103 gearbox 116, generators 112, flywheels 114, shafts (108A and 108B), gears 120, bearings 110, pulley(s), roller(s), sprocket(s), one-way bearing 118, sprag clutch bearing, freewheel clutch bearing, one-way clutch, ratchet system, other components of the power generating apparatus 100 within the platform 122 could depend on where the vehicle's tires 148 (shown in FIG. 11) or where other objects are likely to pass over the top portion of the platform cover 140 of the platforms 122. In a preferred embodiment, the platform 122 does not need to have protrusions 104 and/or apertures 142 situated in locations that cannot harness the force of passing vehicle's tires 148 or other objects because the vehicle tires 148 or other objects will not be passing overhead in those areas. In one embodiment, a shim or shims are used to level the platform(s) 122 so that objects can move smoothly from platform to platform and/or components affixed to/inside the platform(s) 122.

Figure 14:
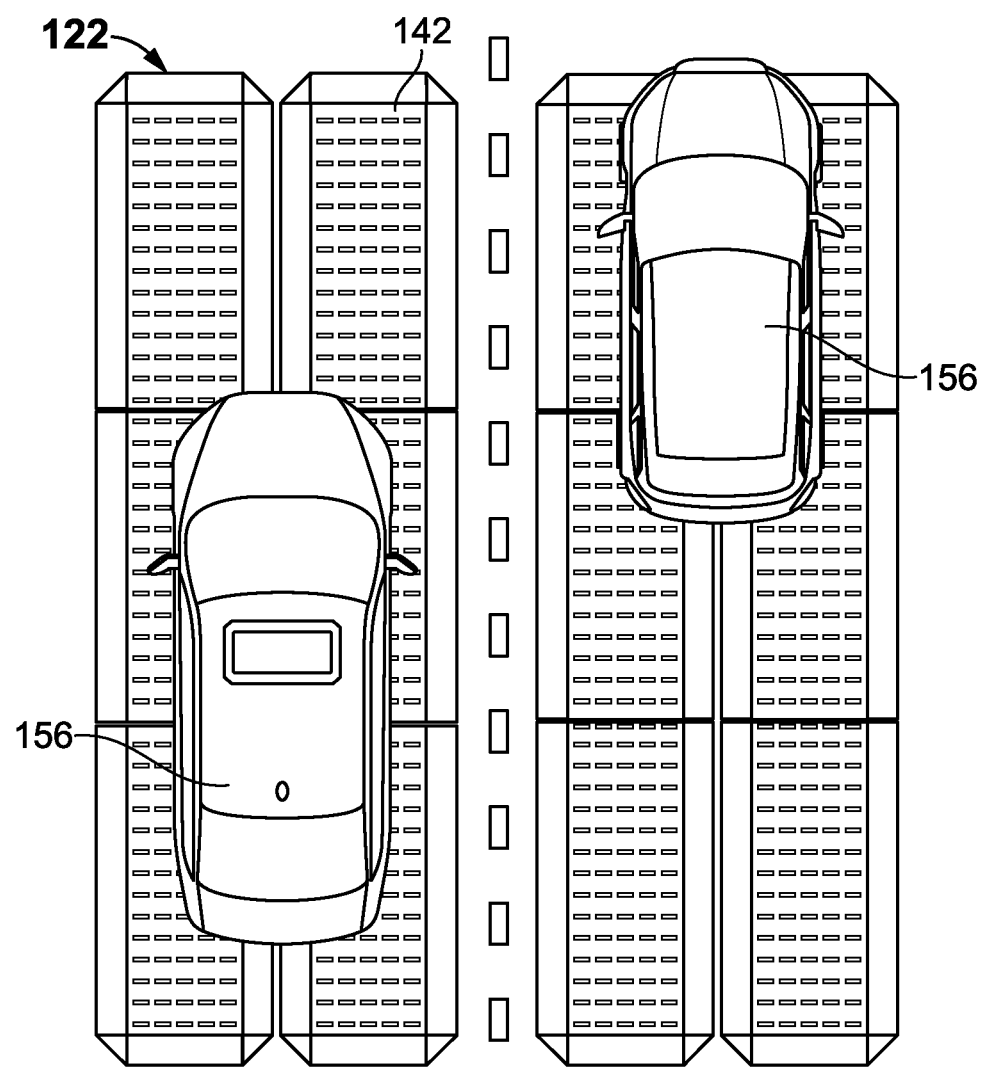
FIG. 14 shows an overhead top view of two parallel platforms with protrusions, and the platforms are placed in a sectional configuration and positioned on a surface, for example, a roadway with vehicles driving over the top surface of the platforms in another embodiment of the present invention.

Referring to FIG. 14, two parallel platforms 122 in a sectional configuration are positioned to lay on top of a surface, that is for example, but not limited to, a roadway or highway is disclosed. In an exemplary embodiment, the platforms 122 are located on roadways and are configured to contain protrusions and apertures only in locations where vehicle tires 148 are likely to roll over on the platform cover 140 of the platform 122. In one embodiment, the electric current generated by the one or more generators 112 of one platform 122 is electrically connected to the power produced by the generators 112 of one or more other platforms 122 via one or more or any or any combination of at least some conductor, insulated conductor, waterproof conductor. In one embodiment, the electric current generated by the generators 112 within at least one platform 122 is connected to an electric distributing network, for example, the power grid, via one or more or any or any combination of at least some conductor, insulated conductor, waterproofed conductor. In one embodiment, the vehicle 156 is at least an object that moves with the aid of a rotating tire or tires, such as but not limited to, vehicles, cars, trucks, buses, semi-trucks, semi-trucks with trailer, tractor trailers, trailers, RVs, SUVs, campers, limousines, cabs, vans, or any other means in or by which someone travels or something is carried or conveyed or transported or any attachments to the vehicles.

Figure 15:
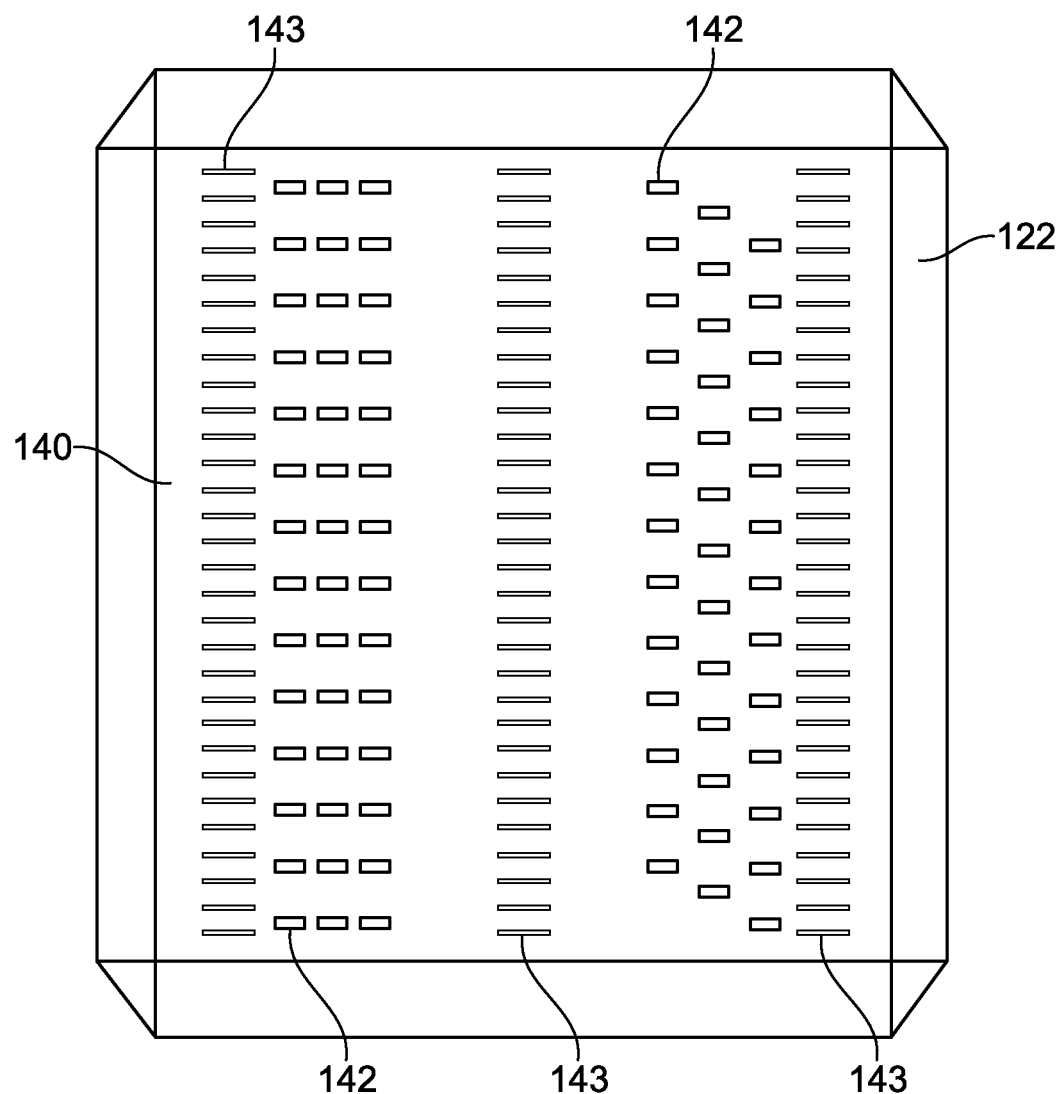
FIG. 15 shows an overhead view of a platform of an electrical power generating apparatus with apertures in the top cover of the platform, as well as raised and/or indented strips that will change the noise made by vehicle tires if vehicle tires drive over the raised and/or indented strips and thus discourage drivers from driving on them, in one embodiment of the present invention.

Referring to FIG. 15, an overhead view of a platform 122 of the electric power generating apparatus 100 with apertures 142 located in the top protective cover 140 of the platform 122 and raised and/or indented strips 143 is disclosed. In one embodiment, a series of raised and/or indented strips 143 are located on a top side exterior/outside of each platform 122. The series of raised and/or indented strips 143 will cause a change in the noise made by vehicle tires when said tire(s) roll over the said raised and/or indented strips 143 in order to encourage and/or discourage objects/vehicles and/or drivers of said vehicles 156 (shown in FIGS. 13 and 14) from/to move/travel/drive on certain parts/sections/locations/area of the platforms 122.

In one embodiment, one or more or any or any combination of reflective device(s)/material(s)/item(s) such as, but not limited to, reflectors, reflecting strips, reflecting coating/paint, other reflecting item(s), are located on the top of the platforms 122 and could be used to mark or display vehicle lane locations on the top side of the platforms 122 or other sections/areas of the platforms 122.

Figure 16A:
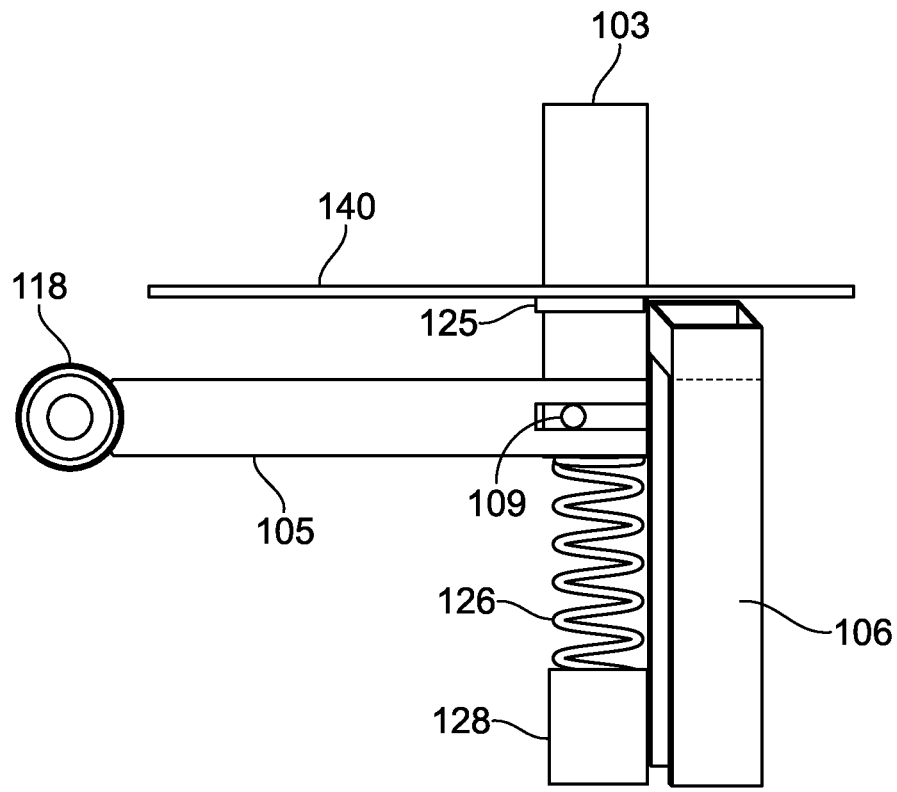
FIGS. 16A-16B shows a side view of a protrusion, lever, reset mechanism, guide, brake, ratchet/one way bearing of the electrical power generating apparatus which will interact with a horizontal shaft (not show) in one embodiment of the present invention.
Figure 16B:
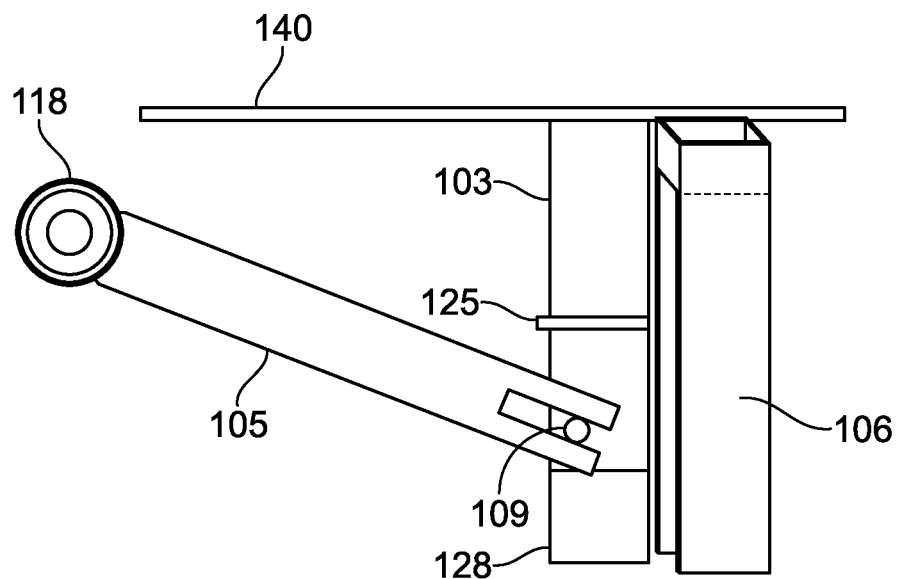

Referring to FIGS. 16A and 16B, a mechanism for converting push force to rotation force in another embodiment of the present invention is disclosed. In this embodiment, the power generating apparatus 100 further comprises one or more shorter protrusions and/or protrusions 103, of one or more heights/length which can be anyone or more items such as but not limited to: shafts, rods, poles, strips, bars, fixtures that interact in an operative manner and/or are affixed to, and also drive/depress a lever 105. In one embodiment, a shorter protrusion 103 is affixed to the lever 105 with a pin 109 or a hinge. In one embodiment, more than one shorter protrusion 103 is configured to drive/depress the same lever 105. In one embodiment, the shorter protrusion 103 is joined to and moves in harmony with at least one or more additional shorter protrusion(s) 103. In one embodiment, a shorter protrusion 103 and lever 105 are one/combined and thus no pin 109 and/or hinge is/are needed to connect the shorter protrusion 103 and lever 105 together, and also in this embodiment the shorter protrusion can be 103 is angled. In one embodiment, one protrusion 103 drives/depresses more than one lever 105. In one embodiment a lever 105 is affixed to a one-way bearing/sprag clutch bearing/freewheel clutch bearing/ratchet system 118, which is in turn affixed to a horizontal shaft or other shaft, thereby rotating the shafts (108A, 108B) (shown in FIG. 1) by converting the downward and/or upward pressing force of a shorter protrusion 103 and lever 105 to rotational motion; additionally, when a shorter protrusion 103 and lever 105 reverses and reset upward, the one way rotation of the shaft 108A, 108B is unhindered because said shaft 108A, 108B is affixed/coupled to a one-way bearing/sprag clutch bearing/freewheel clutch bearing/ratchet system 118. In one embodiment there are more than one lever 105 affixed to a horizontal or other shaft (108A, 108B) (shown in FIG. 1). In one embodiment, the levers 105 are of different lengths. In another embodiment, the levers 105 are of the same length. The horizontal or other shaft (108A, 108B) (shown in FIG. 1) is/are affixed to one or more or any or any combination of generator 112 (shown in FIG. 1), flywheel 114 (shown in FIG. 1), gearbox 116 (shown in FIG. 1), bearing 110 (shown in FIG. 1), shaft (108A 108B shown in FIG. 1). In one embodiment a protrusion 103 and any reset member 126 could move within/through a guide 106 and said guide 106 ensures the protrusion 103 and reset mechanism 126 move properly in their intended route/direction. In one embodiment a reset member 126 is secured to a base/holder 128 using at least any one connector/fastener. The location and position of a guide 106, and the aperture 142 of the platform 122 through which a protrusion 103 passes work together to ensure that a protrusion 103 moves in its proper direction/location. In one embodiment, the section of the guide 106 directs a short protrusion 103 and is located around one or more parts/section(s) of any short protrusion 103. In one embodiment, the guide of the protrusion 103 is the aperture 142 of the platform 122 and/or is incorporated into the aperture 142 of the platform 122. In one embodiment, when a protrusion 103 resets upwards through an aperture 142 (one example shown in FIG. 15), it stops at its proper position by means of a brake/stopper 125. In another embodiment, one or more full length protrusions 104 having at least some teeth affixed and/or incorporated into them, and one or more levers 105 interact with the same horizontal shaft and/or shafts (108A and 108B shown in FIG. 1) to rotate one or more or any or any combination of generators 112, flywheels 114, gearbox 116, and the shafts (108A and 108B shown in FIG. 1). The levers 105 are constructed of material(s) that withstand/endure the powerful forces and torque applied to them, without breaking.

In one embodiment, a generator 112 (shown in FIG. 1) of the power generating apparatus 100 is an axial flux generator. In one embodiment, the generator 112 is a radial flux generator. In one embodiment, the generator 112 is an outrunner generator. In one embodiment, the generator 112 could be an inrunner generator. In one embodiment, generators of more than one design are used. In one embodiment any of the generators 112 may have one or more or any or any combination of rotor, stator, bearing, magnets, and insulated coils.

In one embodiment, one or more mechanisms for converting push force to rotation force are used to harness the passing force of an overhead object/vehicle tire to kick start the rotation of one or more or any or any combination of generator 112, flywheel 114, shaft (108A, 108B), other object(s), before one or more subsequent push force to rotation force mechanisms associated with or without one or more gearboxes 116 is/are used to accelerate the rotation of one or more or any or any combination of generators 112, flywheels 114, shaft (108A, 108B), and/or other items that have already been kick-started. In one embodiment, one or more mechanisms for converting push force to rotation force to kick start one or more or any or any combination of generator 112, flywheel 114, shaft (108A, 108B), other items may or may not be associated with one or more gearboxes 116 of lower gear ratios or any gear ratios. In one embodiment, when the one or more or any or any combination of generator 112, flywheel 114, shafts (108A, 108B), items associated with generators 112 are already rotating, the said one or more kick start mechanism now serves to instead accelerate the rotation of one or more or any or any combination of items whose rotation has already begun.

The electrical power generating apparatus 100 efficiently generates electrical power by harnessing/recycling the force/weight of moving objects, for example, vehicle tires affixed to vehicles, with negligible incremental environment pollution. In one embodiment the electrical power generating apparatuses 100 are installed inside platforms 122 positioned on the top of surfaces, for example, highways and roadways, and thereof, or inside surfaces.

Figure 17:
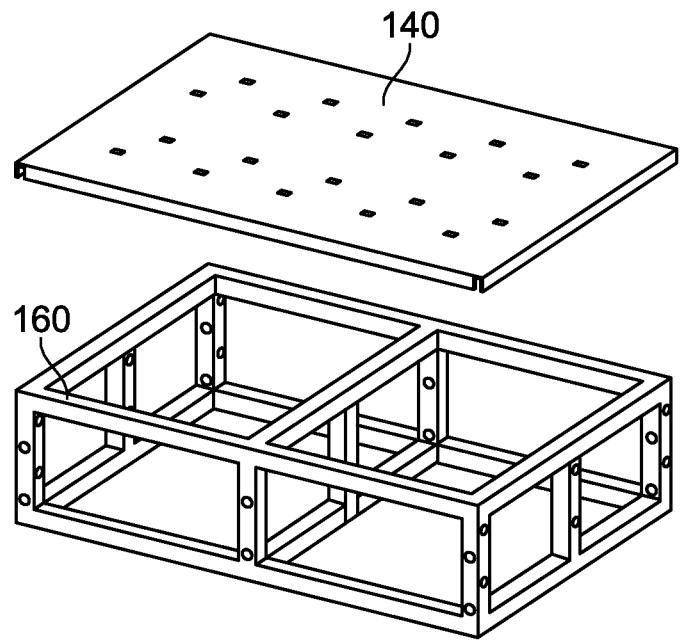
FIG. 17 shows a perspective view of the support structures of a platform design, and the cover of a platform in one embodiment of the present invention.

Referring to FIG. 17, shows an embodiment of a frame structure 160 of a smaller platform 122 module containing one or more power generating apertures 100. In one embodiment, the platforms 122 and/or components associated with the platforms 122 could be constructed of standardized sections/units of any one or more sizes to facilitate efficiencies in manufacturing, installation, replacement, repair, etc. In one embodiment, the platforms 122 and/or the components of the platforms 122 are of standardized dimensions and design so they could be efficiently installed and/or interchanged with replacement platforms/components when repairs/maintenance is/are required. In one embodiment, filler structures/sections are used to fill in sections in between platform structures 122 and/or in between platform structures 122 and roadway sections, and/or platforms 122 and sloping/ramp structures 162, and/or items associated with roadways. In one embodiment, the filler structure/section essentially acts as a platform of one or more or any shapes/sizes. In an exemplary embodiment, the platform 122 comprises a frame structure 160 and the top/protective cover 140 secured on the frame structure 160. In one embodiment, easy to remove filler/fill-in platform or similar structures are designed/used to cover over and/or sit on top of the general areas of the roadway that are occupied by, or contain such items as, but not limited to, manhole/utility covers, utility entry areas items, storm drains, other surfaces, etc. in the actual roadway and said platform filler/fill-in structures can be efficiently removed to provide access to said manhole/utility covers, utility entry areas, storm drains, other road surfaces, etc. in the road, beneath these filler/fill-in platform structures.

Figure 18:
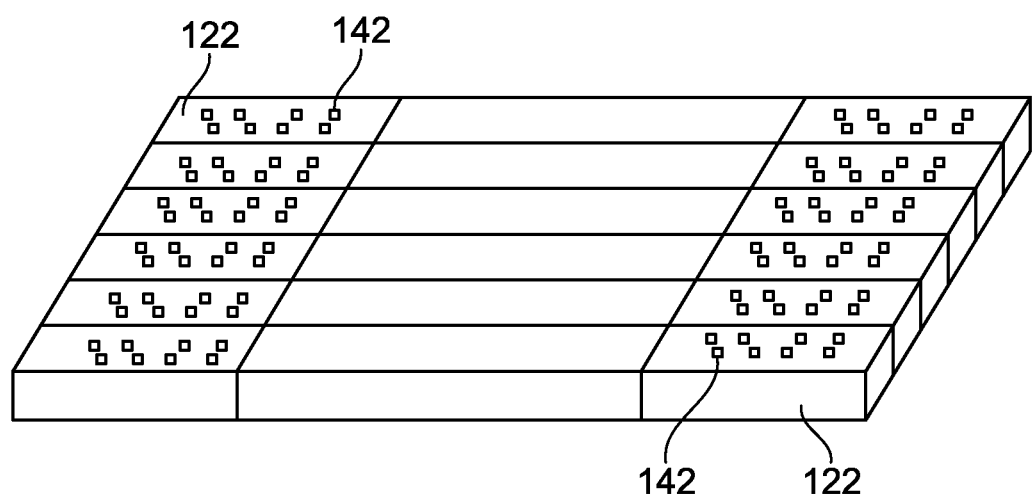
FIG. 18 shows a perspective view of multiple smaller platforms joined together to form a larger single/interconnected platform module in an one embodiment of the present invention.

FIG. 18, displays an embodiment of six (6) of the platform modules of FIG. 17 joined together on the left side of the drawing, plus six (6) additional platform modules of FIG. 17 joined together on the right side of the drawing, plus, in between the left side and right side platform modules of FIG. 17 are six (6) additional middle structures, and in this embodiment all said eighteen (18) structures are joined together into one large platform 122 or network of platforms. In this said embodiment, the combined one large platform 122 or network of platforms covers the width of a one lane road. In this embodiment, it is the 6 platform modules on the left, and the 6 platform modules on the right that contain apertures 142 and protrusions 103, 104 to harness energy from vehicles, because they are located in areas where vehicle tires 148 will pass overhead.

Figure 19:
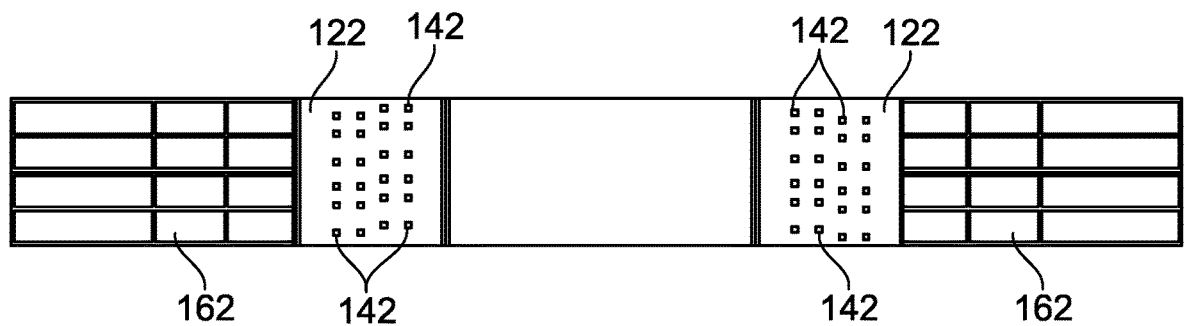
FIGS. 19-20 show a top view and side view of a combination of smaller platform modules interconnected together across a one lane road in an one embodiment of the present invention.
Figure 20:
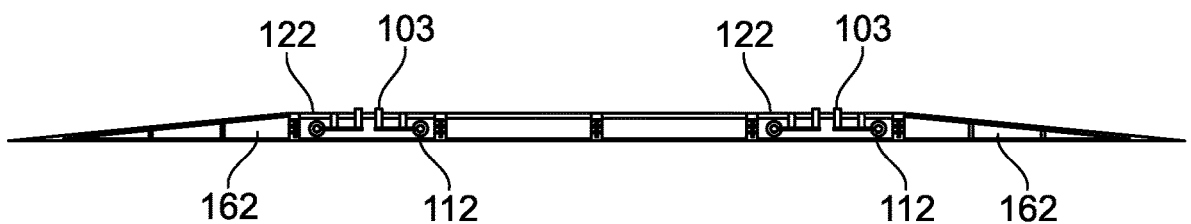

Referring to FIGS. 19, 20; a combination of platform modules and components on a one lane road in an exemplary embodiment are disclosed. FIG. 19 is an overhead view and FIG. 20 is a side view of the same combination of platform modules and components. In both FIGS. 19, 20, the on/off ramps 162 on the left side of the drawing are affixed to a platform 122, and the said platform is the same module as displayed in FIG. 17, and said module is joined to a middle structure, and said middle structure is joined to another platform 122 which is also the same module as displayed in FIG. 17, and that module in FIG. 17 is affixed to another on/off ramp 162. In this one embodiment, five modules/sections are joined together and securely placed on a surface such as but not limited to, a road lane. In this embodiment, the platform 122 on the left side of the drawing (shown in FIG. 20) is configured to harness energy from a vehicle's passing left side tires, and the platform 122 on the right side of the drawing (shown in FIG. 20) is configured to harness energy through a vehicle's passing right side tires. In one embodiment, the north to south length of the five assembled modules/sections in FIGS. 19, 20 is all the same and is approximately 1.5 feet, and those 5 modules/sections are intended to be joined with other modules to cover road surfaces of various lengths. In another embodiment, the north to south length of the modules/sections of FIGS. 19, 20 can be of any length, and the east to west lengths can be of any lengths. By creating platform modules/sections of smaller sizes, the platform sections/modules can be shipped more easily to any location, stored more easily in any location, moved more easily, assembled more easily, etc. In one embodiment, it is easier or more efficient to remove a broken platform module/section and replace it with another one, because the platform module/section being replaced is of standardized dimensions and of a compact size and weight and thus can be more easily removed and replaced.

Figure 21:
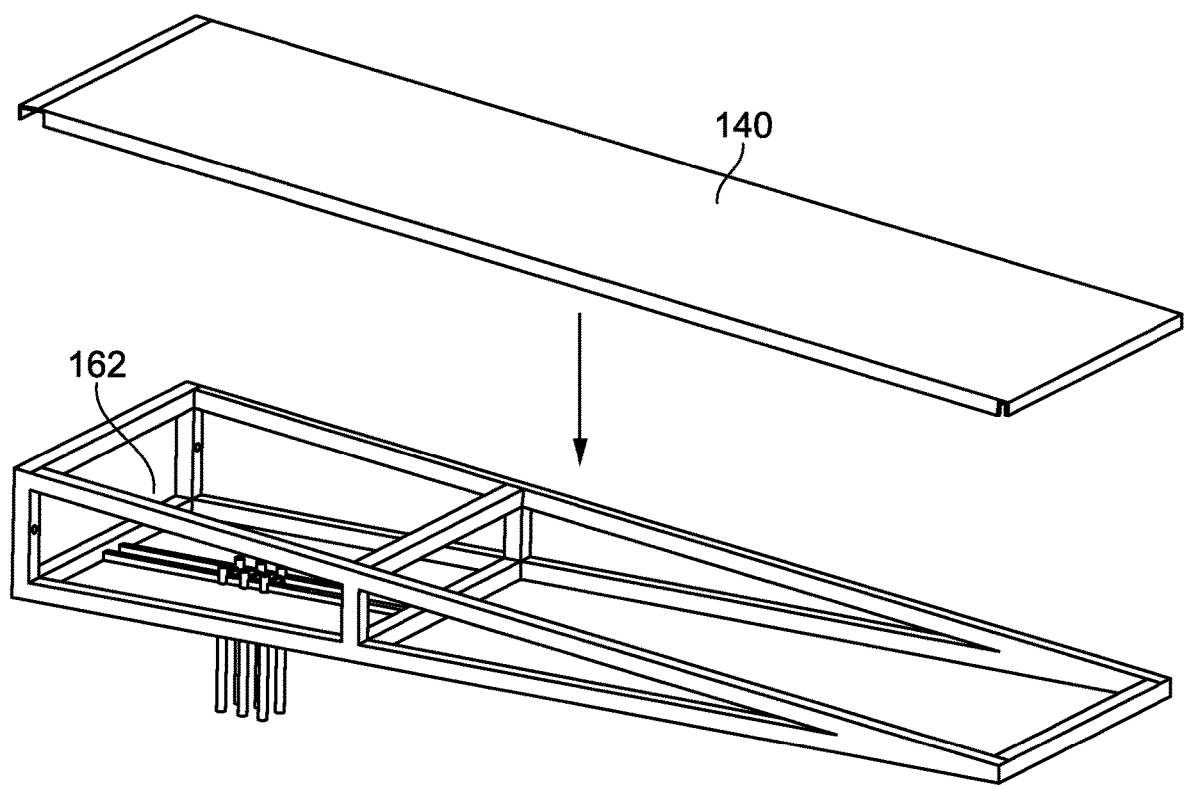
FIG. 21 shows a perspective view of a sloped/inclined/declined/ramp section of the platform in one embodiment of the present invention.

Referring to FIG. 21, a sloped/inclined/declined/ramp section 162 of the platform 122 in one embodiment is disclosed. In one embodiment, the platform 122 includes sloped/inclined/declined/ramp surfaces 162 around the exterior outside/side portions of the platform 122. In one embodiment, the sloped/inclined/declined/ramp section 162 could be located around any exterior outside/side portions adjacent to a road surface, to enable smooth traveling of the vehicles 156 (shown in FIGS. 13, 14) on and off the platforms 122. In one embodiment, the inclined/sloped/declined/ramp sections 162 bridge the top portion of the platform cover 140 with the surface on which they are placed. In one embodiment, the sloped/inclined/declined/ramp section 162 is affixed to one or more platforms 122. In one embodiment, the sloped/included/declined/ramp section 162 and the one or more platforms 122 are one component/fixture/section. In one embodiment, the sloped/inclined/declined/ramp section 162 and the one or more platforms 122 are different components/fixtures/sections. In one embodiment, bolts/shafts/rods/bars/items could be affixed to the sloped/inclined/declined/ramp section 162 of the platform and used to affix/lock the network of platforms 122 to the road/ground. In one embodiment, the bolts/shafts/rods/bars/items used to affix one or more platforms 122 and/or platform sections/modules to the road/ground can be affixed to one or more platforms 122 or platform sections/modules. In one embodiment, at least one ramp/slope 162 bridges a top surface of at least one platform 122 to the lower surface onto which a platform is placed, and said ramp/slope 162 facilitates the transfer of objects between two surfaces of different heights, and the said ramp/slope 162 is excluded where the top surface of the platform and any other surface of different height do not require smooth transfer of an object between the at least two surfaces.

Figure 22:
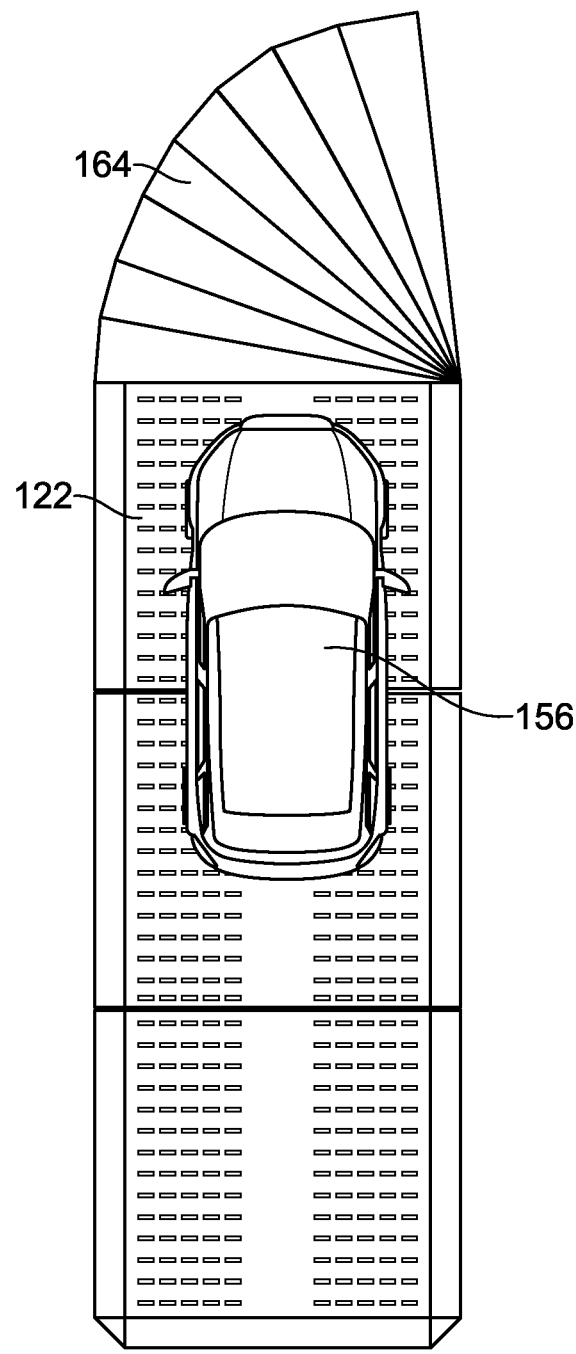
FIG. 22 shows a top view of a platform structure used to accommodate curves or turns in roadways according to another embodiment of the present invention.

Referring to FIG. 22, a platform wedge structure 164 is displayed. In this embodiment, one or more platform wedge structures 164 are used to accommodate curves and/or turns in roads. In one embodiment, each wedge structure 164 has one end that is narrower or wider than the opposite end to form a wedge. In one embodiment, one or more platforms 122 could be affixed one or more wedge 164 structures to accommodate one or more turns/curves in a road. In one embodiment, the wedge 164 structures could be of any one or more or length(s), height(s), width(s), diameter(s), shape(s), and size(s). It one embodiment, the wedge 164 structures are used to accommodate slight turns or any curves on a road. In another embodiment, such as in the case of sharp turns in/on a road the use of sloped/inclined/declined/ramps 162 could instead be used to transfer vehicles from a platform 122 back onto the road surface until the vehicle is through the turn/curve, and then one or more other sloped/inclined/declined/ramps 162 could be used to transfer the vehicle back onto a platform 122 after the turn is completed.

Figure 23:
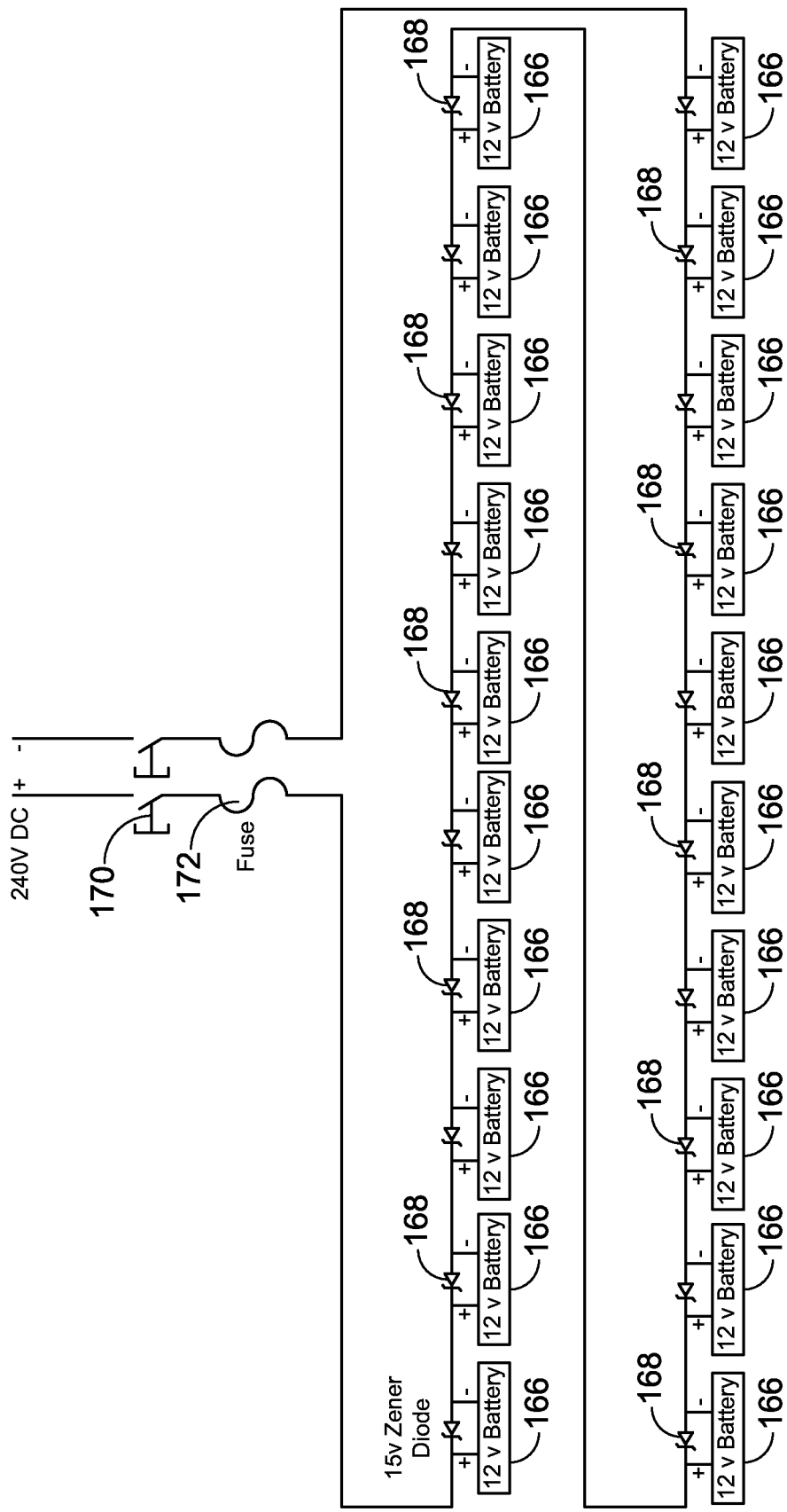
FIG. 23 shows a bank of batteries/energy storage devices, associated with the present invention in one embodiment of the present invention.

Referring to FIG. 23, one embodiment of an assembly of batteries of the present invention is disclosed. In one embodiment, the present invention comprises one or more batteries 166. In one embodiment, the present invention comprises one or more energy storage devices and/or systems such as, but not limited to, capacitor, battery, energy storage device, which are used to store the electricity/power produced by one or more generators 112 in one or more platforms 122. In one embodiment, an assembly of batteries is comprised of one or more batteries 166. In one embodiment, at least one diode 168 is associated with each battery 166. In one embodiment, two or more batteries 166 are associated with one diode 168. In one embodiment two or more diodes 168 are associated with one or more batteries 166. In one embodiment, the assembly of batteries could be located anywhere, such as but not limited to, before the inverter, before the grid. In one embodiment, one or more or any or any combination of switch 170, fuse 172, other item, are associated with the batteries 166 and/or inverter 196. In one embodiment, electric current passes through the batteries 166, and through an inverter 196, and to a power grid.

Figure 24:
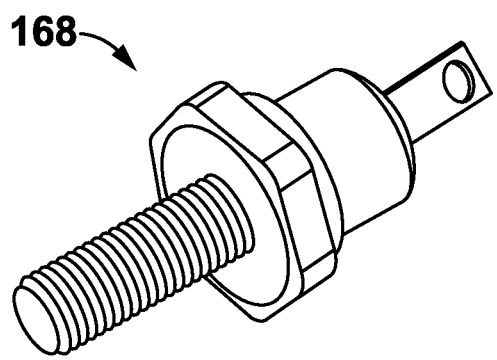
FIG. 24 shows a perspective view of a diode used in the present invention.

Referring to FIG. 24, a diode 168 associated with one or more batteries 166 is disclosed. In one embodiment, one or more diodes 168 are associated with the batteries 166. In one embodiment, the diodes 168 are configured to allow current to flow in one direction, but severely restricts current from flowing in the opposite direction.

Figure 25:
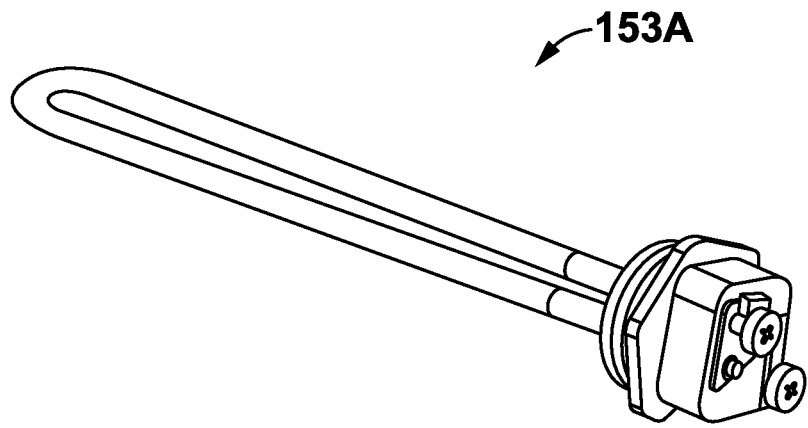
FIGS. 25-26 show perspective views of heating items/objects used to melt ice and/or snow in an exemplary embodiment of the present invention.
Figure 26:
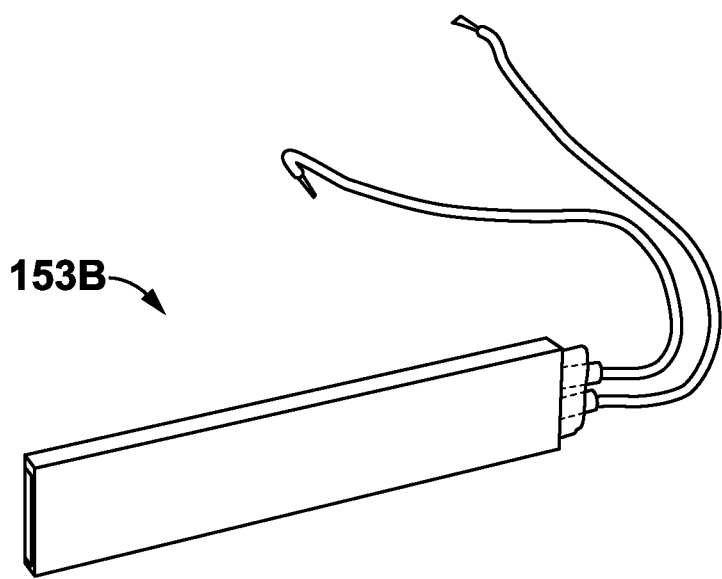

Referring to FIGS. 25-26, two embodiments of heating objects/items (153A and 153B) for melting ice and/or snow in an area disclosed. In one embodiment, one or more heating objects/items (153A and 153B) are positioned within the platform 122 or top cover 140 of the platform 122 for melting or preventing the ice or snow buildup on the platform 122.

Figure 27:
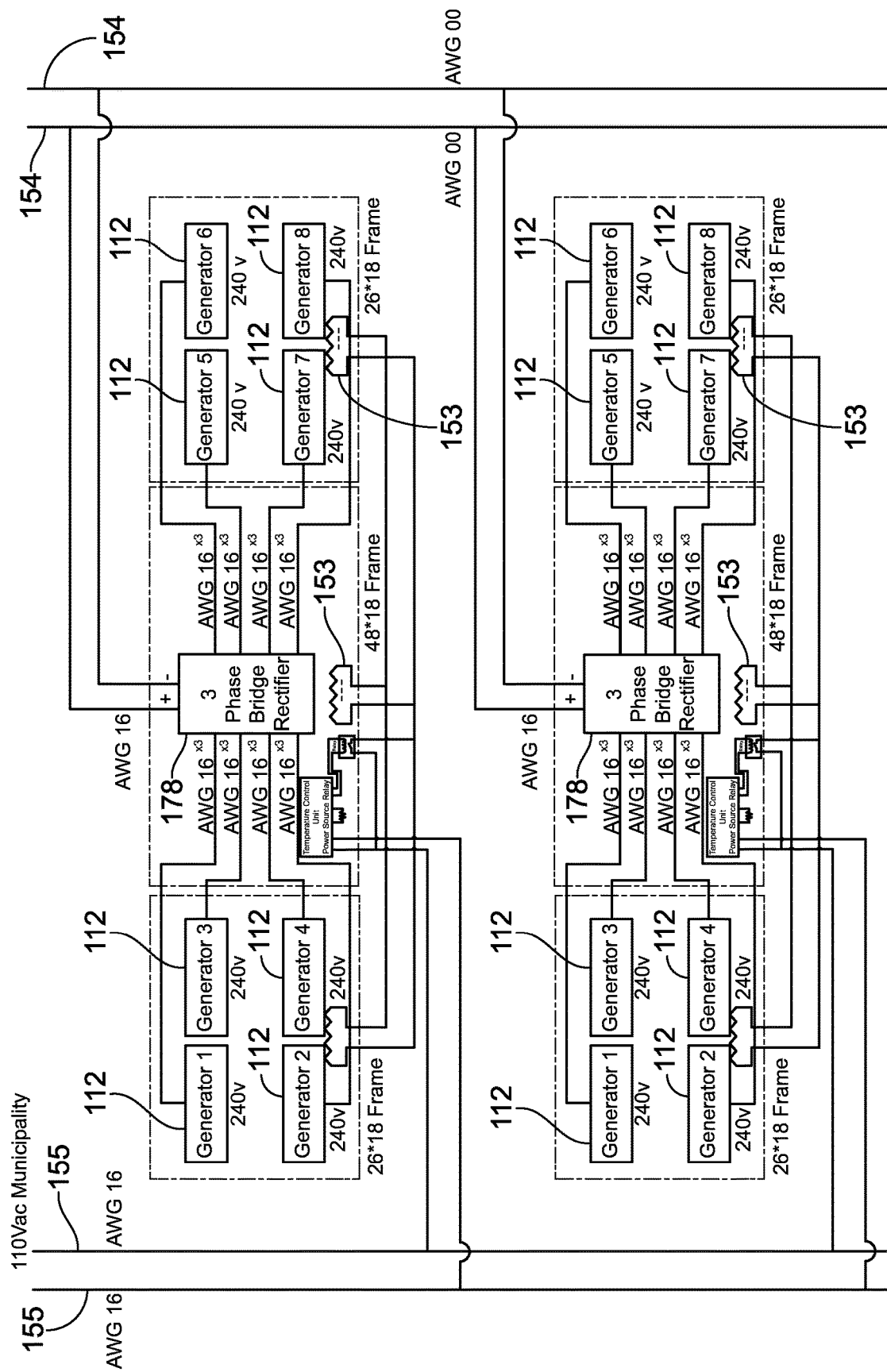
FIG. 27 shows a simple electric schematic of wiring associated with the platforms of the present invention to deliver power from the generators to the power grid, as well as to deliver electricity from the power grid to the heating objects/items used to melt snow and ice on top of the platforms, in one embodiment of the present invention.

Referring to FIG. 27, a block diagram of some of the electrical and electrical related components/items of the platforms and other items of the present invention are disclosed. In one embodiment, at least one 3-phase bridge rectifier 178 is electrically connected to one or more generators 112 for rectifying the AC (Alternating Current) produced by the generators 112 into DC (Direct Current). The Direct current is transferred through at least some conductors 154. In one embodiment, as least some conductor is at least partially connected to one or more batteries 166 shown in FIG. 23. In one embodiment power that is produced by one or more generators 112 passes through one or more or any or any combination of rectifier 178 (shown in FIGS. 27, 28), battery 166, power storage device, conductor, inverter, before being transferred to an electric grid. In one embodiment, the heating items(s)/device(s) 153, 153A, 153B, associated with the platforms 122 are used to prevent and/or melt slow and ice build up on one or more platforms 122.

Figure 28:
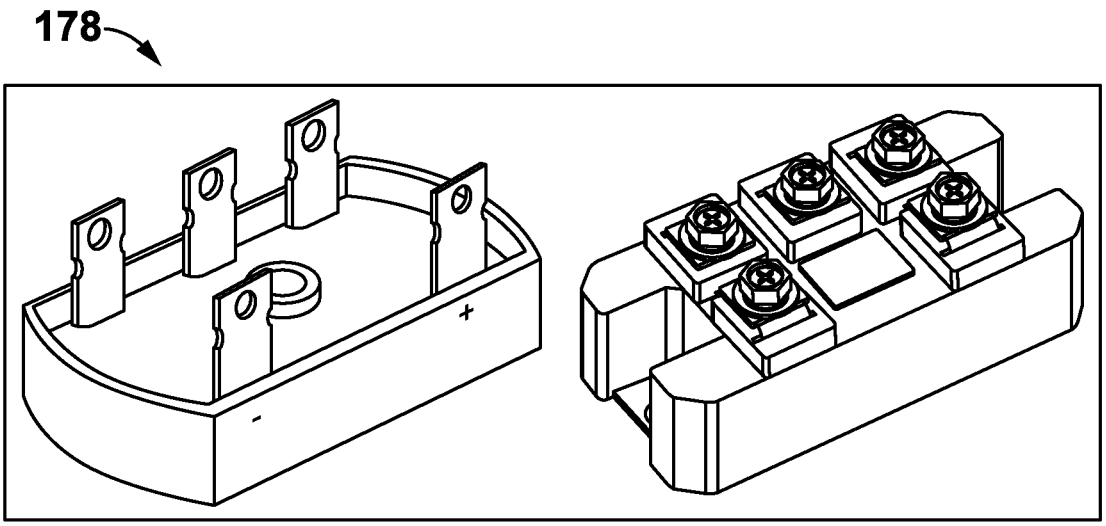
FIG. 28 shows a perspective view of a 3-phase bridge rectifier in an exemplary embodiment of the present invention.

Referring to FIG. 28, a 3-phase bridge rectifier 178 in an exemplary embodiment of the present invention is disclosed. In one embodiment, a 3-phase bridge rectifier 178 converts the input AC (Alternating Current) produced by at least one generator 112 into DC (Direct Current). In one embodiment, the 3-phase bridge rectifier 178 is electrically connected to one or more generators 112.

Figure 29:
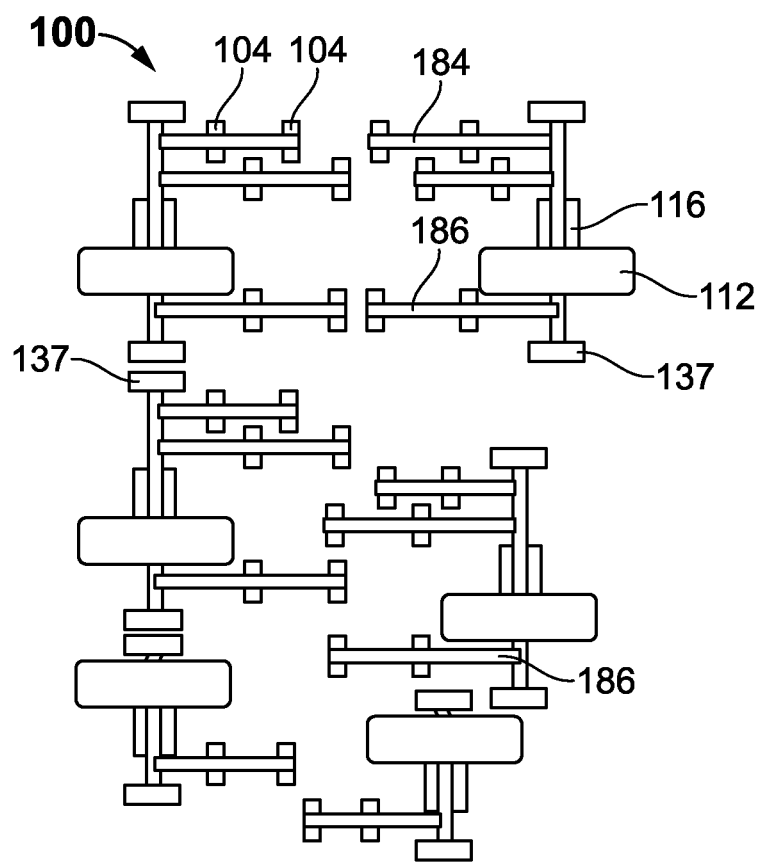
FIG. 29 shows a simplified overhead cut away inside view of multiple power generating mechanism and their generators, flywheels, gearboxes, kick-starters, shafts, push force to rotation force systems, protrusions, other items, in another embodiment of the present invention.

Referring to FIG. 29, a simplified overhead cut away inside view of multiple power generating apparatuses 100 located inside one platform module in another embodiment of the present invention is disclosed. In one embodiment, the multiple power generating apparatuses 100 are arranged inside the platform 122 to maximum the efficiency of available space and maximize the efficiency of harnessing power from passing overhead vehicles. In one embodiment, vehicle traffic is passing/moving from south to north above a top section/cover 140 of the platform 122, and said top section/cover 140 is located above the power generating apparatuses 100 shown in FIG. 29. In one embodiment, the multiple power generating apparatuses 100 and associated objects could be placed inside the platforms 122 where chances are high that vehicle tires will pass overhead as shown in FIG. 29. In one embodiment, the protrusion 104 of smaller sizes could be attached to the same lever 184, 105 and said protrusions 104 can be placed in locations where chances are high that vehicle tires will pass overhead. In one embodiment, a protrusion 104 is associated with a kick start lever/item 186 and could be positioned before a gearbox 116 so a vehicle's 156 tire can first drive over said protrusion 104 affixed to the top of a lever 184, 105, which depresses the kick start lever/item 186, which kick starts the generator 112 with or without engaging/activating a gearbox. In one embodiment, after the generator 112 is kick started, the vehicle's tires subsequently strike/depress one or more other protrusions 104 which depress/move one or more subsequent levers/items 186 that may or may not engage a gearbox 116 to accelerate the rotation of the generator 112 that has been kick started. In one embodiment, if a generator 112 has already been kick started and is rotating when a kick start lever/item 186 is next depressed, then the kick start lever/item 186 will instead continue to rotate, and/or accelerate the rotation of the one or more generators 112. In one embodiment there can be one or more lever/item 184 associated with the same generator 112.

Figure 30:
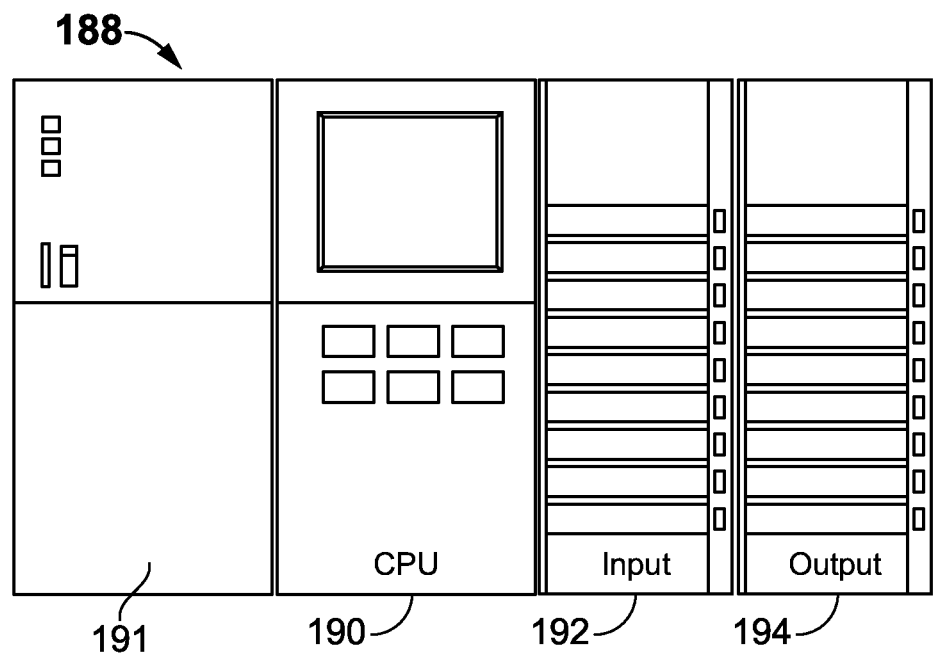
FIG. 30 shows a programmable logic controller (PLC) associated more than one item of the present invention in one embodiment of the present invention.

Referring to FIG. 30, disclosed is one embodiment of a programmable logic controller (PLC) 188 associated with the present invention. In one embodiment, the PLC 188 is comprised of at least one central processing unit (CPU) 190, at least one input module 192, and at least one output module 194, a power supply and/or back up power supply 191. In one embodiment, the CPU 190 comprises a microprocessor, a memory chip, integrated circuits, a backup battery, a computer screen for a user interface, a time clock, and calendar for scheduling. In one embodiment, the microprocessor is configured to perform calculations and execute one or more programs. In one embodiment, the memory chip is configured to store one or more programs, output history, faults, alarms, etc. In one embodiment, the integrated circuits could allow the user to program, reprogram, monitor devices/items. In one embodiment, a backup battery could be provided in case of power outages. In one embodiment, a computer screen could be used for easy user interface. In one embodiment, the time clock and calendar are used to time stamp events and/or to trigger events based on the programmed dates and times, In one embodiment, the one or more input module 192 is/are associated with one or more or any or any combination of field sensors, digital inputs, such as but not limited to on/off switches, bimetallic temperature strips, motion sensors, float switches, other items. In one embodiment, the one or more output module 194 could be one or more field output devices. In one embodiment, the PLC 188 could be located anywhere. In one embodiment, the PLC 188 is located in a temperature controlled setting and/or location/area/facility.

Figure 31:
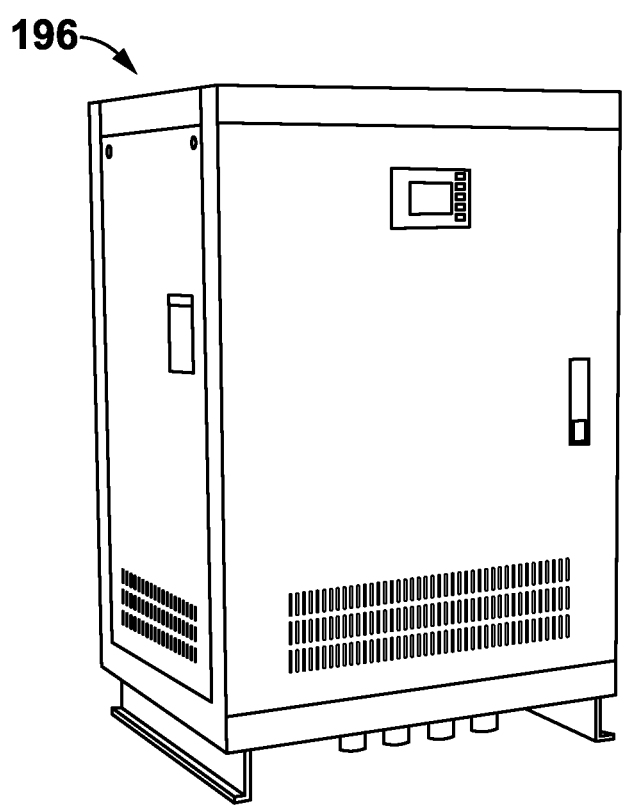
FIG. 31 shows a perspective view of a sine wave inverter used to convert DC current generated by the power generating apparatus of the present invention into AC current in one embodiment of the present invention.

Referring to FIG. 31, a sine wave inverter 196 used to convert DC current into AC current. In one embodiment one or more generators 112 produce power in AC current and said AC current is passed through a 3 phase bridge rectifier 178 which convert the AC power into DC current, and then said current is passed to or through one or more batteries 166, and then the DC current from the one or more batteries 166 is converted into AC current by a sine wave inverter 196 and then transferred to an electric power distributing network, for example, a power grid.

In one embodiment, one or more platforms 122 contain one or more items or to remove, dissipate, transfer, or spread heat produced by one or more generators 112 or other items inside the platforms 122. In one embodiment the items used to remove, dissipate, transfer, or spread heat are one or more or any or any combination of fan, heat sink, heat pipe, radiator, heat exchanger, fins, thermal block, fluid, water, conduit, other item. In one embodiment any of the said fan, heat sink, heat pipe, radiator, heat exchanger, fins, thermal block, fluid, water, conduit, other items are linked to one or more generators 112.

In one embodiment, one or more platforms 122 of the present invention supply electric power to electric powered vehicles that are either driving, or stopped, or both driving and stopped, on/along at least a section of an upper surface/structure 140 of one or more platforms 122. In this embodiment, the one or more platforms will provide electric current and transmit it wirelessly to electric powered vehicles that are on a top surface 140 of the platform to charge and/or power said electric powered vehicles. The said embodiment provides for wireless power charging so that power is transmitted to the electric powered vehicle without requiring a wire/plug to attach a power source associated with the platform 122 of the present invention to/with the electric power vehicle positioned on a top surface/structure 140 of the said one or more platforms. The wireless power system used to power electric powered vehicles may comprise of one or more or any or any combination of items such as but not limited to: inductive conductor coils, oscillator electrical circuits, power rectifier, other items. The power source(s) for the electric power that will be supplied to power the said electric powered vehicles can be provided from the power generated from one or more power generating systems 100 of the present invention, or one or more power storage devices associated with the present invention, or an electric power grid, or any combination thereof. In one embodiment there are one or more indicators on a top section of one or more platforms that clearly indicate where wireless charging is located on the platforms of the present invention.

In one embodiment, one or more platforms 122 of the present invention contain equipment/devices/components/items used in the transmission of radio signals such as but not limited to signals for cellular voice, data transmission, video transmission, other transmission. In one embodiment, the equipment/devices/components/items used to transmit such signals may include, but are not limited to, transmitters, receivers, power amplifiers, combiners, filters, digital signal processor, power supply, network interface modules, fiber optic cable, other cable, other conductor, other items. In one embodiment one or more platform structures house one or more or any or any combination of cell sites, radio sites, antennas, cellular base stations, radio base stations, other wireless transmission equipment.

In one embodiment, one or more platforms 122 of the present invention house/contain/channel one or more or any or any combination of items such as but not limited to; fiber optic cable, other cable, conductor, conductor for transmission of electricity, cell site, antenna, water pipe, gas pipe, oil pipe, fuel pipe, waste water pipe, electrical power charging hardware, wired and/or wireless data/video/voice transmission equipment, other object.

Although some embodiments of the invention have been illustrated in the accompanying drawings and described in the above detailed description, it must be understood that the invention is not limited to the embodiments developed herein, but is capable of numerous rearrangements, modifications, combinations, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may and can be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in a generic and descriptive sense and not for purposes of limitation. Accordingly, the present invention is not limited to the specific embodiments illustrated herein.

What is claimed is:

1. An electrical power generating apparatus, comprising:
   a raised platform positioned on a surface that an object traverses, the platform including a cavity configured to receive at least one protrusion, at least one shaft, and at least one generator, wherein the at least one protrusion, the at least one shaft, and the at least one generator are operably connected to each other;
   the platform having an elongated top portion which includes, at least one aperture formed in the top portion, wherein the at least one protrusion is vertically-oriented relative to the top portion;
   wherein the at least one protrusion is configured to move through the at least one aperture and extend above the top portion in an initial state of the at least one protrusion, and the at least one protrusion is contained within the at least one aperture in a secondary state, the at least one protrusion positioned to fill the at least one aperture relative to the top portion when in the secondary state such that no indentation remains in the top portion when the at least one protrusion is moved from the initial state to the secondary state;
   a reset member configured to move the at least one protrusion between the initial state and the secondary state;
   a first subset including the at least one protrusion, the at least one shaft, and the at least one generator, and further comprising a first plurality of protrusions, a first plurality of shafts, and a first plurality of generators;
   a second subset including the at least one protrusion, the at least one shaft, and the at least one generator, and further comprising a second plurality of protrusions, a second plurality of shafts, and a second plurality of generators,
   wherein the at least one aperture further comprises a plurality of apertures, and each respective protrusion of the first and second plurality of protrusions is associated with a respective aperture of the plurality of apertures,
   a push force to rotation force conversion system translating a push force applied to the first subset of the first plurality of protrusions to a rotational force applied to the first plurality of shafts and the first plurality of generators, and translating a push force applied to the second subset of the second plurality of protrusions to a rotational force applied to the second plurality of shafts and the second plurality of generators, wherein the push force to rotation force conversion system comprises teeth which are incorporated or affixed to at least a portion of the first plurality of protrusions and the second plurality of protrusions, and the first plurality of protrusions and the second plurality of protrusions are connected, respectively, in an operative manner to the first plurality of shafts and the second plurality of shafts via respective gears, thereby rotating the first plurality of shafts and the second plurality of shafts,
   wherein the push force to rotation force conversion system is configured to convert weight or force of the object that rotationally contacts the top portion, and when the rotational weight or force of the object moves over the top portion and the object contacts a portion of the first and/or second plurality of protrusions of the first and/or second subset, respectively, positioned in the top portion, only the portion of the first and/or second plurality of protrusions contacted moves, and the object is not moved away from the top portion of the platform by contact with the portion of the first and/or second plurality of protrusions,
   wherein the first subset and the second subset are spaced apart from each other such that the first subset and the second subset are positioned in an axial alignment relative to each other and relative to an axial alignment of the elongated top portion of the platform which is positioned on the surface comprising a lane of a roadway, the at least one object moving over at least one of the first subset, the second subset, and an inactive area.

2. The apparatus of claim 1, wherein each protrusion is positioned vertically relative to the top portion in the initial state and in the secondary state.

3. The apparatus of claim 2, wherein each protrusion of one of the first and second plurality of protrusions includes at least one of a) a protrusion having a portion which forms a rack gear which engages a pinion gear that is operably connected to at least one shaft of the first and second plurality of shafts, respectively, and b) a protrusion having a pivotable lever that is operably connected to at least one shaft of the first and second plurality of shafts, respectively.

4. The apparatus of claim 1, wherein each shaft of the first and second plurality of shafts, respectively includes at least one generator from the first and second plurality of generators, respectively.

5. The apparatus of claim 1, wherein an electric current created by the plurality of generators is at least partially transferred tom electric power grid or power storage unit(s) via one or more conductors.

6. The apparatus of claim 1, wherein the at least one object comprises a pair of tires of a vehicle, the pair of tires positioned in a transverse alignment relative to the axial alignment of the top portion of the platform as well as the axial alignment of the first and second subsets and the inactive area therebetween, such that one tire of the pair of tires contacts one portion of the first plurality of protrusions of the first subset and the other tire of the pair of tires contacts another portion of the second plurality of protrusions of the second subset simultaneously when the pair of tires are positioned to traverse over the platform providing a section of the lane of the roadway.

7. The apparatus of claim 1, wherein the top portion includes an inactive area without electrical generation therefrom, the inactive area formed without any of the first and second plurality of protrusions of the first and second subsets, respectively, and the inactive area is positioned between the first subset and the second subset, such that the first subset, the inactive area, and the second subset are positioned in an axial alignment relative to each other and relative to an axial alignment of the elongated top portion of the platform.

8. The apparatus of claim 1, wherein an exterior of the platform is colored and/or coated with a color or colors to reflect or absorb wavelengths of sunlight in order to reflect heat away from the platform and/or its contents or to absorb heat to warm the platform and/or its contents, and further comprising one or more heating items configured to heat the top surface of the platform.

9. The apparatus of claim 1, wherein at least one energy storage device is operably linked to at least one generator of the first plurality generators and the second plurality of generators, and wherein the at least one energy storage device is operably associated with at least one diode.

10. The apparatus of claim 9, further comprising an AC to DC converter operably connected to the at least one generator of at least one of the first plurality of generators and the second plurality of generators.

11. The apparatus of claim 9, further comprising a DC to AC inverter operably connected to the at least one energy storage device and to an electrical grid, to convert direct current stored by the at least one energy storage device to alternating current carried by the electrical grid.

12. An electrical power generating apparatus, comprising:
a raised platform positioned on a surface that an object traverses, the platform including a cavity configured to receive at least one protrusion, at least one rotating shaft, and at least one generator, the at least one protrusion, the at least one rotating shaft, and the at least one generator being operatively connected to each other;
the platform having an elongated top portion which includes at least one aperture formed in the top portion, wherein the at least one protrusion is vertically oriented relative to the top portion;
wherein the at least one protrusion is configured to move through the at least one aperture and extend above the top portion in an initial state of the at least one protrusion, and the at least one protrusion is contained within the at least one aperture when in a secondary state, such that the at least one protrusion is positioned to fill the at least one aperture relative to the top portion in the secondary state such that no indentation remains in the top portion when the at least one protrusion is moved from the initial state to the secondary state;
a reset member configured to move the at least one protrusion between the initial state and the secondary state;
at least one subset includes the at least one protrusion, the at least one shaft, and the at least one generator, and further comprises a plurality of protrusions, a plurality of rotating shafts, and a plurality of generators,
wherein the at least one aperture comprises a plurality of apertures, and each respective protrusion of the plurality of protrusions is associated with a respective aperture of the plurality of apertures,
a push force to rotation force conversion system translating a push force applied to the plurality of protrusions of the at least one subset to a rotational force applied to the plurality of rotating shafts of the at least one subset and the plurality of generators of the at least one subset;
wherein in the at least one subset, at least one respective generator of the plurality of generators is mounted to and positioned around one respective rotating shaft of the plurality of rotating shafts, the plurality of rotating shafts causing rotation of one or more electrical generating elements of the plurality of generators,
wherein the rotation of the plurality of generators requires downward movement of a respective portion of protrusions of the plurality of protrusions through respective apertures of the plurality of apertures from the initial position to the secondary position,
wherein the push force to rotation force conversion system is configured to convert weight or force of at least one object that rotationally contacts the top portion, and when the rotational weight or force of the at least one object moves over the top portion and contacts at least a portion of the plurality of protrusions of the at least one subset, such that only the portion of the plurality of protrusions contacted moves, and the at least one object is not moved away from the top portion of the platform by contact with the portion of the plurality of protrusions, and
wherein the top portion includes an inactive area positioned next to the at least one subset, such that the at least one subset and the inactive area are positioned side-by-side in an axial alignment relative to each other and relative to an axial alignment of the elongated top portion of the platform that is positioned on the surface comprising at least one lane of a roadway,
wherein the at least one object comprises a vehicle having at least one pair of spaced-apart tires positioned transversely relative to a chassis of the vehicle positioned therebetween, at least one tire of the at least one pair of spaced-apart tires moving over the at least one subset and the chassis positioned over at least a portion of the inactive area.

13. The apparatus of claim 12, wherein each protrusion is positioned vertically relative to the top portion in the initial state and in the secondary state.

14. The apparatus of claim 13, wherein each protrusion of one of the first and second plurality of protrusions includes at least one of a) a protrusion having a portion which forms a rack gear which engages a pinion near that is operably connected to at least one shaft of the first and second plurality of shafts, respectively, and b) protrusion having pivotable lever that is operably connected to at least one shaft of the first and second plurality of shafts, respectively.

15. The apparatus of claim 12, wherein each shaft of the first and second plurality of shafts, respectively includes at least one generator from the first and second plurality of generators, respectively.

16. The apparatus of claim 12, wherein an electric current created by the plurality of generators is at least partially transferred to an electric power grid or power storage unit(s) via one or more conductors.

17. The apparatus of claim 12, wherein an exterior of the platform is colored and/or coated with a color or colors to reflect or absorb wavelengths of sunlight in order to reflect heat away from the platform and/or its contents or to absorb heat to warm the platform and/or its contents, and further comprising one or more heating items configured to heat the top surface of the platform.

18. The apparatus of claim 12, wherein at least one energy storage device is operably linked to at least one generator of the first plurality generators and the second plurality of generators, and wherein the at least one energy storage unit is operably associated with at least one diode.

19. The apparatus of claim 18, further comprising an AC to DC converter operably connected to the at least one generator of at least one of the first plurality of generators and the second plurality of generators.

20. The apparatus of claim 18, further comprising a DC to AC inverter operably connected to the at least one energy storage device and to an electrical grid, to convert direct current stored by the at least one energy storage device to alternating current carried by the electrical grid.

\* \* \* \* \*